United States Patent
Mo et al.

(10) Patent No.: US 10,397,330 B2
(45) Date of Patent: Aug. 27, 2019

(54) STORING CONTENT ITEMS

(71) Applicant: Google LLC, Mountain View, CA (US)

(72) Inventors: Vincent Mo, Sunnyvale, CA (US); Christian Wyglendowski, Westerville, OH (US); Indrajit Khare, Mountain View, CA (US); David Lieb, San Francisco, CA (US); Shaun Tungseth, San Bruno, CA (US); Venkatesan Esakki, San Jose, CA (US); Juan Carlos Miguel Anorga, San Francisco, CA (US); Leslie Ikemoto, Los Altos, CA (US); Matthew Steiner, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/980,309

(22) Filed: May 15, 2018

(65) Prior Publication Data
US 2018/0262570 A1 Sep. 13, 2018

Related U.S. Application Data

(62) Division of application No. 14/747,677, filed on Jun. 23, 2015, now Pat. No. 10,015,252.
(Continued)

(51) Int. Cl.
*G06F 15/16* (2006.01)
*H04L 29/08* (2006.01)
*G06F 3/06* (2006.01)

(52) U.S. Cl.
CPC .......... *H04L 67/1097* (2013.01); *G06F 3/067* (2013.01); *G06F 3/0608* (2013.01);
(Continued)

(58) Field of Classification Search
CPC ....... H04L 29/08729; H04L 29/08801–08819; H04L 67/2842–2852;
(Continued)

(56) References Cited

U.S. PATENT DOCUMENTS

| 4,746,993 A | 5/1988 | Tada |
| 6,122,411 A | 9/2000 | Shen et al. |

(Continued)

FOREIGN PATENT DOCUMENTS

| CN | 101084665 | 12/2007 |
| CN | 102591913 | 7/2012 |

(Continued)

OTHER PUBLICATIONS

Notice of Allowance for U.S. Appl. No. 15/161,128, dated Apr. 23, 2018, 11 pages.
(Continued)

*Primary Examiner* — Brendan Y Higa
(74) *Attorney, Agent, or Firm* — IP Spring

(57) ABSTRACT

Implementations generally relate to storing content items. In some implementations, a method includes receiving content items on a mobile device. The method includes storing the content items on local storage on the mobile device. The method includes determining available local storage capacity of the mobile device. The method includes uploading content items to secondary storage, and selecting content items to remove from the local storage or add to the local storage based on predetermined criteria, for example, when the available local storage capacity meets a threshold available local storage capacity.

20 Claims, 13 Drawing Sheets

Related U.S. Application Data

(60) Provisional application No. 62/016,354, filed on Jun. 24, 2014, provisional application No. 62/166,899, filed on May 27, 2015.

(52) U.S. Cl.
CPC .......... *G06F 3/0647* (2013.01); *G06F 3/0649* (2013.01); *H04L 29/08819* (2013.01); *H04L 67/16* (2013.01); *H04L 67/2852* (2013.01)

(58) Field of Classification Search
CPC ..... G06F 3/064–0653; G06F 17/30129; G06F 17/30132; G06F 17/30902; G06F 17/30138
See application file for complete search history.

(56) References Cited

U.S. PATENT DOCUMENTS

| | | | |
|---|---|---|---|
| 6,967,675 B1 | 11/2005 | Ito et al. | |
| 7,437,725 B1* | 10/2008 | Chang | G06F 17/30893 709/201 |
| 7,640,406 B1 | 12/2009 | Hagerstrom et al. | |
| 8,117,303 B2 | 2/2012 | Fonsen | |
| 8,385,950 B1 | 2/2013 | Wagner | |
| 2002/0099807 A1* | 7/2002 | Doyle | G06F 12/126 709/223 |
| 2003/0097418 A1 | 5/2003 | Yajima | |
| 2003/0151982 A1* | 8/2003 | Brewer | G04G 21/00 368/46 |
| 2004/0090539 A1 | 5/2004 | Kim et al. | |
| 2005/0243020 A1* | 11/2005 | Steeb | G06F 3/14 345/1.3 |
| 2006/0069742 A1* | 3/2006 | Segre | H04L 67/1095 709/217 |
| 2007/0147769 A1 | 6/2007 | Nagaoka et al. | |
| 2007/0169125 A1* | 7/2007 | Qin | G06F 9/4881 718/102 |
| 2007/0220220 A1 | 9/2007 | Ziv et al. | |
| 2008/0064377 A1 | 3/2008 | Mori | |
| 2008/0106601 A1 | 5/2008 | Matsuda | |
| 2008/0250024 A1* | 10/2008 | Kvm | G06F 17/30132 |
| 2009/0086271 A1 | 4/2009 | Shiokawa | |
| 2009/0141795 A1 | 6/2009 | Horie | |
| 2009/0182836 A1* | 7/2009 | Aviles | H04L 41/0893 709/213 |
| 2009/0219413 A1 | 9/2009 | Hidaka | |
| 2010/0077174 A1* | 3/2010 | Ma | G06F 9/5011 711/171 |
| 2010/0174790 A1* | 7/2010 | Dubs | G06Q 10/10 709/206 |
| 2012/0016838 A1 | 1/2012 | Arai et al. | |
| 2012/0226663 A1 | 9/2012 | Valdez Kline et al. | |
| 2013/0227082 A1 | 8/2013 | Lin | |
| 2014/0032666 A1 | 1/2014 | Chan et al. | |
| 2014/0032833 A1 | 1/2014 | Cudak et al. | |
| 2014/0129627 A1 | 5/2014 | Baldwin et al. | |
| 2014/0132798 A1 | 5/2014 | Li et al. | |
| 2014/0156793 A1 | 6/2014 | Chan et al. | |
| 2014/0181443 A1 | 6/2014 | Kottomtharayil et al. | |
| 2014/0192228 A1 | 7/2014 | Lee | |
| 2014/0300769 A1 | 10/2014 | Hartford | |
| 2014/0337327 A1 | 11/2014 | Barton | |
| 2015/0040022 A1 | 2/2015 | Pippuri et al. | |
| 2015/0088805 A1* | 3/2015 | Kakarla | G06F 17/30306 707/600 |
| 2015/0186092 A1* | 7/2015 | Francis | G06F 3/1423 345/520 |
| 2015/0301903 A1 | 10/2015 | Mutha et al. | |
| 2015/0341561 A1 | 11/2015 | Petrescu et al. | |
| 2015/0373181 A1 | 12/2015 | Rahman et al. | |
| 2016/0140702 A1 | 5/2016 | Kindle et al. | |
| 2016/0192178 A1 | 6/2016 | Blong et al. | |
| 2016/0234293 A1 | 8/2016 | Berger et al. | |
| 2016/0315902 A1 | 10/2016 | Silva et al. | |
| 2016/0373270 A1 | 12/2016 | Yang et al. | |
| 2017/0031449 A1 | 2/2017 | Karsten et al. | |

FOREIGN PATENT DOCUMENTS

| | | |
|---|---|---|
| EP | 2397938 | 12/2011 |
| JP | 2003-150417 | 5/2003 |
| JP | 2014-44268 | 3/2014 |
| WO | 2011148496 | 12/2011 |
| WO | 2014030307 | 2/2014 |
| WO | 2015200339 | 12/2015 |

OTHER PUBLICATIONS

First Action Interview, Pre-Interview Communication for U.S. Appl. No. 15/161,128, 7 pages, dated Sep. 11, 2017.
Notice of Preliminary Rejection in Korean Application No. 10-2016-7035805, 11 pages, dated Oct. 16, 2017.
International Preliminary Report on Patentability in U.S. Application No. PCT/US2015/037211, 13 pages, dated Dec. 27, 2016.
"No Strings Attached: Sleek, Connected and Cloud-Based Action Video Camera Launches in US", iON USA, https://usa.ioncamera.com/no-strings-attached-sleek-connected-and-cloud-based-action-video-camera-launches-in-us/downloaded Sep. 2, 2015, May 22, 2012, 5 pages.
European Patent Office, Written Opinion for International Patent Application No. PCT/US2015/037211, dated Sep. 18, 2015, 12 pages.
European Patent Office, International Search Report for International Patent Application No. PCT/US2015/037211, dated Sep. 18, 2015, 5 pages.
Notice of Reasons for Rejection in Japanese Application No. 2016-572644, 5 pages, dated Jan. 15, 2018.
Popper, Ben, "YouTube Music is here, and its a game changer", The Verge, http://www.theverge.com/2015/11/12/9723496/youtube-music-app-offline-background, 8 pages, Nov. 12, 2015.
Stobing, Chris, et al., "How to Use Google Drive Offline on a Desktop or Mobile Device", How-To Geek, http://www.howtogeek.com/227032/how-to-use-google-drive-offline-on-a-deskop-or-mobile-device/, 6 pages, Aug. 31, 2015.
Facebook Business, "Testing a New Way for Marketers to Tell Stories in News Feed", Facebook, 9 pages, Dec. 17, 2013.
First Action Interview, Office Action Summary for U.S. Appl. No. 15/161,128, 8 pages, dated Dec. 11, 2017.
International Search Report for International Patent Application No. PCT/US2017/057040, 5 pages, dated Nov. 28, 2017.
Written Opinion for International Patent Application No. PCT/US2017/057040, 7 pages, dated Nov. 28, 2017.
Notice of Allowance in Korean Application No. 10-2016-7035805, dated Apr. 12, 2018, 2 pages.
Written Opinion of the International Preliminary Examining Authority for International Patent Application No. PCT/US2017/057040, dated Apr. 10, 2018, 6 pages.
Non-Final Office Action in U.S. Appl. No. 14/747,677, 10 pages, dated Nov. 3, 2017.
Notice of Allowance in U.S. Appl. No. 14/747,677, 17 pages, Feb. 15, 2018.
Decision of Rejection in Japanese Application No. 2016-572644, 4 pages, dated Sep. 10, 2018.
Written Opinion for International Patent Application No. PCT/US2017/057040, 6 pages, dated Apr. 10, 2018.
Notification of First Office Action in Chinese Application No. 201580034436.5, 13 pages, dated Oct. 22, 2018.
Notice of Allowance in Japanese Application No. 2016-572644, 3 pages, dated Feb. 4, 2019.
Notification of Second Office Action in Chinese Application No. 201580034436.5, 33 pages dated Mar. 22, 2019.
First Action Interview, Pre-Interview Communication for U.S. Appl. No. 15/405,131, 7 pages, dated May 23, 2019.

* cited by examiner

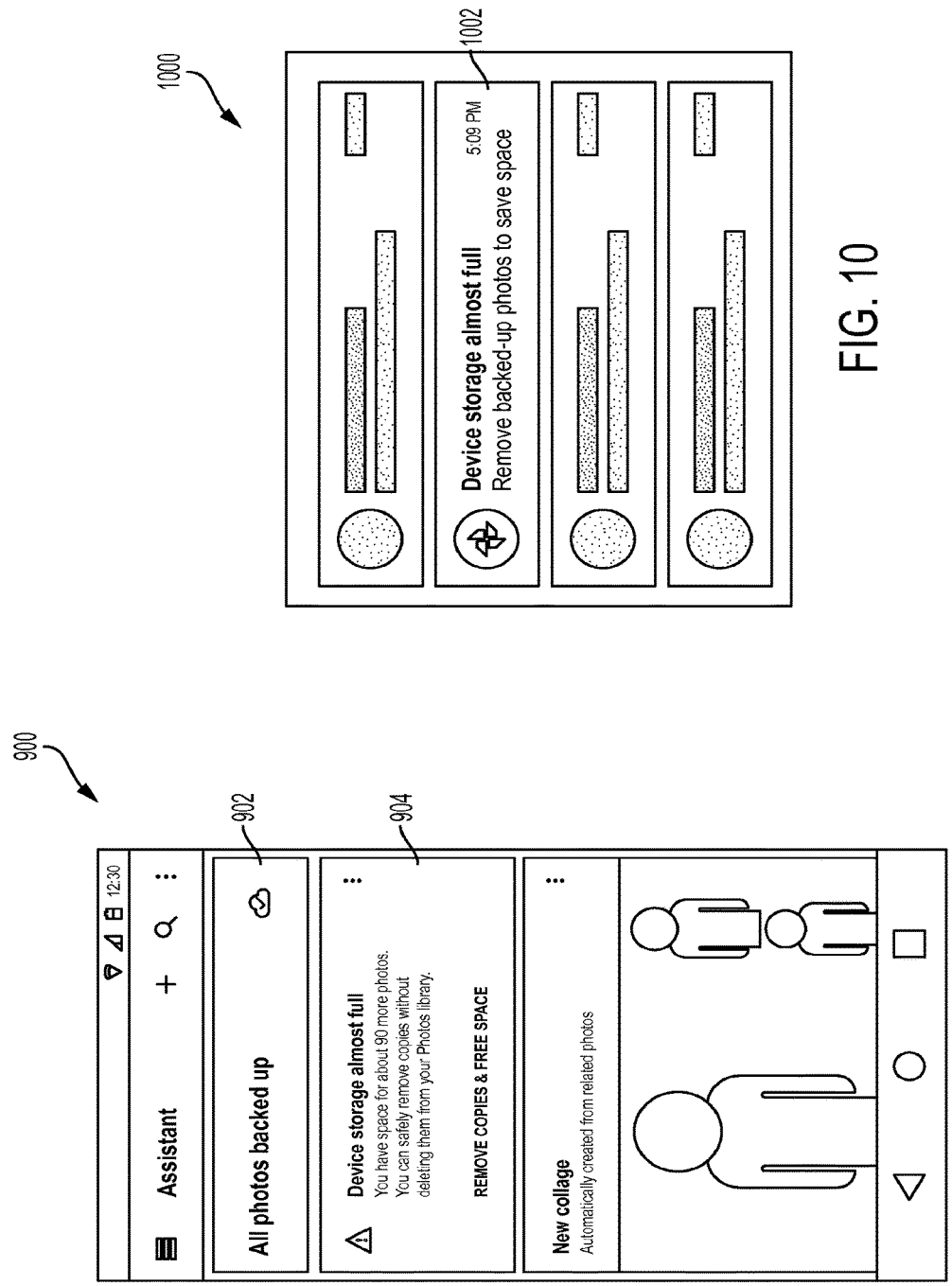

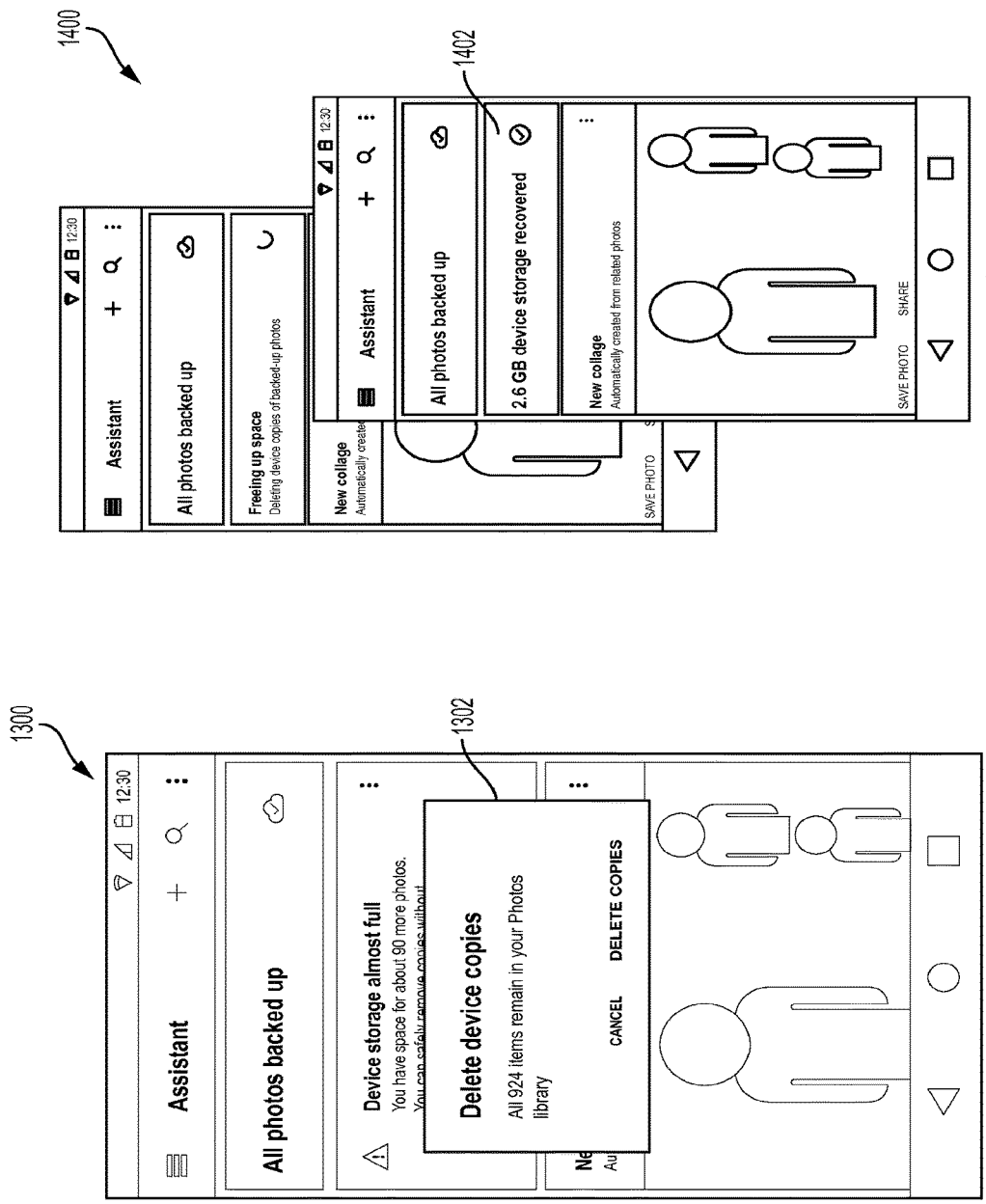

STORING CONTENT ITEMS

CROSS-REFERENCE TO RELATED APPLICATIONS

This application is a divisional of, and claims priority to, U.S. patent application Ser. No. 14/747,677, filed Jun. 23, 2015, which claims the benefit of U.S. Provisional Patent Application Ser. No. 62/016,354, filed Jun. 24, 2014, and U.S. Provisional Patent Application Ser. No. 62/166,899, filed May 27, 2015, the disclosures of which are hereby expressly incorporated by reference in their entirety.

BACKGROUND

Mobile devices have limited local storage capacity. When a mobile device user downloads or creates content such as photos, the content typically is stored in files on the local storage of the device. Many popular uses of mobile devices create files of large data size (e.g., photos, videos, music, email, documents, games, applications, etc.).

SUMMARY

Implementations generally relate to storing content items. In some implementations, a method of management of local storage on a mobile device includes receiving content items on the mobile device. The method includes storing the content items on local storage on the mobile device. The method includes determining available local storage capacity of the mobile device. The method includes uploading the content items to secondary storage, and selecting one or more of the content items to remove from the local storage based on predetermined criteria when the available local storage capacity meets a threshold local storage capacity level. The predetermined criteria may include temporal data associated with one or more of the content items, a likelihood of access of one or more of the content items, and a strength of relationship between a user of the mobile device and one or more persons associated with one or more of the content items. The method includes removing the selected one or more of the content items from local storage.

In some implementations, a method of management of local storage on a mobile device includes receiving content items on the mobile device, storing the content items on local storage on the mobile device, determining available local storage capacity of the mobile device, uploading the content items to secondary storage, and selecting one or more of the content items to remove from the local storage based on predetermined criteria when the available local storage capacity meets a threshold local storage capacity level.

In some implementations, the predetermined criteria may include temporal data associated with capture of one or more of the content items. In some implementations, the predetermined criteria may include a frequency of access of one or more of the content items. In some implementations, the predetermined criteria may include a likelihood of access of one or more of the content items. In some implementations, the predetermined criteria may include an importance of one or more of the content items. The importance of one or more content items may be based on a strength of relationship between a user of the device and one or more persons associated with one or more of the content items. In some implementations, the predetermined criteria may include events coincident with one or more of the content items. In some implementations, the predetermined criteria may include a poster of one or more of the content items. In some implementations, the predetermined criteria may include a recipient of one or more of the content items. In some implementations, the predetermined criteria may include tags associated with one or more of the content items. In some implementations, the predetermined criteria may include responses to one or more of the content items. In some implementations, the predetermined criteria may include check-in data associated with one or more of the content items. In some implementations, the predetermined criteria may include geographic and/or location data associated with one or more of the content items. In some implementations, the predetermined criteria may include event data associated with one or more of the content items. In some implementations the predetermined criteria may include events coincident with one or more of the content items. In some implementations, the predetermined criteria may include social affinity between a user of the device and one or more of the content items. In some implementations, the predetermined criteria may include image recognition results associated with one or more of the content items. In some implementations, the predetermined criteria may include a similarity of one or more of the content items to one or more other content items. In some implementations, the predetermined criteria includes whether one or more of the content items have been successfully uploaded to secondary storage. In some implementations, the predetermined criteria may include access of content items from a wearable device. In some implementations, the predetermined criteria may be selected based on a user profile. In some implementations, the predetermined criteria may include one or more of these predetermined criteria. In some implementations, the predetermined criteria may be a combination of two or more of these criteria and/or other criteria.

In some implementations, the method may include generating a placeholder copy of a first one of the selected one or more of the content items on the device and locally storing the placeholder copy of the first one of the selected one or more of the content items on the device. In some implementations, content items each may include one or more of a photo, image, graphic, video, text, tag, or post.

In some implementations, a system for management of local storage on a mobile device includes one or more processors and instructions encoded in one or more tangible media for execution by the one or more processors, the instructions when executed operable to receive content items on a mobile device, store the content items on local storage on the mobile device, determine available local storage capacity of the mobile device, upload the content items to secondary storage, and select one or more of the content items to remove from the local storage based on predetermined criteria when the available local storage capacity meets a threshold available local storage capacity level.

In some implementations, the predetermined criteria may include temporal data associated with capture of one or more of the content items. In some implementations, the predetermined criteria may include a frequency of access of one or more of the content items. In some implementations, the predetermined criteria may include a likelihood of access of one or more of the content items. In some implementations, the predetermined criteria may include an importance of one or more of the content items. The importance of one or more content items may be based on a strength of relationship between a user of the device and one or more persons associated with one or more of the content items. In some implementations, the predetermined criteria may include events coincident with one or more of the content items. In some implementations, the predetermined criteria may include a poster of one or more of the content items. In some implementations, the predetermined criteria may include a recipient of one or more of the content items. In some implementations, the predetermined criteria may include tags associated with one or more of the content items. In some implementations, the predetermined criteria may include responses to one or more of the content items. In some implementations, the predetermined criteria may include check-in data associated with one or more of the content items. In some implementations, the predetermined criteria may include geographic and/or location data associated with one or more of the content items. In some implementations, the predetermined criteria may include event data associated with one or more of the content items. In some implementations the predetermined criteria may include events coincident with one or more of the content items. In some implementations, the predetermined criteria may include social affinity between a user of the device and one or more of the content items. In some implementations, the predetermined criteria may include image recognition results associated with one or more of the content items. In some implementations, the predetermined criteria may include a similarity of one or more of the content items to one or more other content items. In some implementations, the predetermined criteria includes whether one or more of the content items have been successfully uploaded to secondary storage. In some implementations, the predetermined criteria may include access of content items from a wearable device. In some implementations, the predetermined criteria may be selected based on a user profile. In some implementations, the predetermined criteria may include one or more of these predetermined criteria. In some implementations, the predetermined criteria may be a combination of two or more of these criteria and/or other criteria.

In some implementations, the instructions are further operable to create a placeholder copy of a first one of the selected one or more of the content items on the device. In some implementations, the instructions are further operable to store the placeholder copy of the first one of the selected one or more of the content items on the local storage.

In some implementations, the instructions are further operable to determine, upload and select periodically.

In some implementations, a system to manage local storage on a mobile device, includes means for receiving content items on a mobile device and means for storing the content items on local storage on the mobile device. The system includes means for determining available local storage capacity of the mobile device, means for uploading the content items to secondary storage, and means for selecting one or more of the content items to remove from the local storage based on predetermined criteria, when the available local storage capacity meets a threshold available local storage capacity level.

In some implementations, a non-transitory computer readable storage medium has instructions stored thereon to manage local storage on a mobile device. The instructions includes a first computer readable program code that receives content items on the mobile device, a second computer readable program code that stores the content items on local storage on the mobile device, a third computer readable program code that uploads the content items to secondary storage, and a fourth computer readable program code that selects one or more of the content items to remove from the local storage based on predetermined criteria, when available local storage capacity meets a threshold available local storage capacity level.

In some implementations, a computer-implemented method to manage storage on a mobile device includes determining available local storage capacity of a mobile device. The method includes determining that the available local storage capacity meets a threshold available local storage capacity. The method includes, in response to a determination that the available local storage capacity meets a threshold available local storage capacity, selecting one or more of the content items in local storage and secondary storage to store in local storage based on a score associated with the one or more of the content items in local storage and secondary storage based on predetermined criteria, the predetermined criteria including one or more of temporal data associated with one or more of the content items, a likelihood of access of one or more of the content items, and a strength of relationship between a user of the mobile device and one or more persons associated with one or more of the content items. The method includes downloading one or more of the selected one or more of the content items in the secondary storage to the mobile device from the secondary storage. The method includes storing the downloaded one or more of the selected one or more of the content items on local storage on the mobile device. The method includes removing from the local storage one or more of the content items located in the local storage that were not selected to store in the local storage.

In some implementations, a computer-implemented method to manage storage on a mobile device includes determining available local storage capacity of a mobile device. The method includes determining that the available local storage capacity meets a threshold available local storage capacity. The method includes, in response to a determination that the available local storage capacity meets a threshold available local storage capacity, selecting one or more of the content items to store in local storage based on predetermined criteria. The method includes downloading the selected one or more of the content items to the mobile device from the secondary storage. The method includes storing the downloaded selected one or more of the content items on the local storage on the mobile device.

In some implementations, the secondary storage is remote from the mobile device. In some implementations, the secondary storage is separate from the mobile device. In some implementations, the secondary storage includes networked storage. In some implementations, the secondary storage includes cloud storage.

In some implementations, the method may include removing from the local storage one or more of the content items that were not selected. In some implementations, the method may include selecting one or more of content items to store placeholder copies in local storage.

In some implementations, the method includes creating a placeholder copy of one of the selected one or more of the content items, and replacing the one of the selected one or more of the content items with the placeholder copy in local storage. In some implementations, the content items may include one or more of a photo, image, graphic, video, text, tag, or post.

In some implementations, the predetermined criteria may include temporal data associated with capture of one or more of the content items. In some implementations, the predetermined criteria may include a frequency of access of one or more of the content items. In some implementations, the predetermined criteria may include a likelihood of access of one or more of the content items. In some implementations, the predetermined criteria may include an importance of one or more of the content items. The importance of one or more content items may be based on a strength of relationship between a user of the device and one or more persons associated with one or more of the content items. In some implementations, the predetermined criteria may include events coincident with one or more of the content items. In some implementations, the predetermined criteria may include a poster of one or more of the content items. In some implementations, the predetermined criteria may include a recipient of one or more of the content items. In some implementations, the predetermined criteria may include tags associated with one or more of the content items. In some implementations, the predetermined criteria may include responses to one or more of the content items. In some implementations, the predetermined criteria may include check-in data associated with one or more of the content items. In some implementations, the predetermined criteria may include geographic and/or location data associated with one or more of the content items. In some implementations, the predetermined criteria may include event data associated with one or more of the content items. In some implementations the predetermined criteria may include events coincident with one or more of the content items. In some implementations, the predetermined criteria may include social affinity between a user of the device and one or more of the content items. In some implementations, the predetermined criteria may include image recognition results associated with one or more of the content items. In some implementations, the predetermined criteria may include a similarity of one or more of the content items to one or more other content items. In some implementations, the predetermined criteria includes whether one or more of the content items have been successfully uploaded to secondary storage. In some implementations, the predetermined criteria may include access of content items from a wearable device. In some implementations, the predetermined criteria may be selected based on a user profile. In some implementations, the predetermined criteria may include one or more of these predetermined criteria. In some implementations, the predetermined criteria may be a combination of two or more of these criteria or other criteria.

In some implementations, the method may include marking for removal from the local storage one or more content items that were not selected. In some implementations, the method may include uploading content items from the mobile device to secondary storage. In some implementations, the mobile device is a wearable device and the secondary storage is storage on a smart phone.

In some implementations, a system for management of local storage on a mobile device includes one or more processors and instructions encoded in one or more tangible media for execution by the one or more processors. The instructions when executed are operable to determine available local storage capacity of a mobile device, determine that the available local storage capacity meets a threshold available local storage capacity, in response to a determination that the available local storage capacity meets a threshold available local storage capacity, select one or more of the content items to store in local storage based on predetermined criteria, download the selected one or more of the content items to the mobile device from secondary storage, and store the downloaded selected one or more content items on the local storage on the mobile device.

In some implementations, the instructions are further operable to create a placeholder copy of one of the selected content items and to replace the one of the selected content items with the placeholder copy in local storage.

In some implementations, the secondary storage includes cloud storage that is remote from the mobile device. In some implementations, the instructions are further operable to remove from the local storage one or more of the content items that were not selected. In some implementations, the instructions are further operable to select one or more of the content items to store placeholder copies in the local storage.

In some implementations, the predetermined criteria may include temporal data associated with capture of one or more of the content items. In some implementations, the predetermined criteria may include a frequency of access of one or more of the content items. In some implementations, the predetermined criteria may include a likelihood of access of one or more of the content items. In some implementations, the predetermined criteria may include an importance of one or more of the content items. The importance of one or more content items may be based on a strength of relationship between a user of the device and one or more persons associated with one or more of the content items. In some implementations, the predetermined criteria may include events coincident with one or more of the content items. In some implementations, the predetermined criteria may include a poster of one or more of the content items. In some implementations, the predetermined criteria may include a recipient of one or more of the content items. In some implementations, the predetermined criteria may include tags added to one or more of the content items. In some implementations, the predetermined criteria may include responses to one or more of the content items. In some implementations, the predetermined criteria may include check-in data associated with one or more of the content items. In some implementations, the predetermined criteria may include geographic and/or location data associated with one or more of the content items. In some implementations, the predetermined criteria may include event data associated with one or more of the content items. In some implementations the predetermined criteria may include events coincident with one or more of the content items. In some implementations, the predetermined criteria may include social affinity between a user of the device and one or more of the content items. In some implementations, the predetermined criteria may include image recognition results associated with one or more of the content items. In some implementations, the predetermined criteria may include a similarity of one or more of the content items to one or more other content items. In some implementations, the predetermined criteria includes whether one or more of the content items have been successfully uploaded to secondary storage. In some implementations, the predetermined criteria may include access of content items from a wearable device. In some implementations, the predetermined criteria may be selected based on a user profile. In some implementations, the predetermined criteria may include one or more of these predetermined criteria. In some implementations, the predetermined criteria may be a combination of two or more of these criteria or other criteria.

In some implementations, the instructions are further operable to mark for removal from the local storage one or more content items that were not selected. In some implementations, the instructions are further operable to upload content items from the mobile device to secondary storage. In some implementations, the mobile device is a wearable device and the secondary storage is storage on a smart phone.

In some implementations, a system to manage local storage on a mobile device includes means for determining available local storage capacity of a mobile device and means for determining that the available local storage capacity meets a threshold available local storage capacity. The system includes means for selecting one or more of the content items to store in local storage based on predetermined criteria in response to a determination that the available local storage capacity meets a threshold available local storage capacity. The system includes means for downloading the selected one or more of the content items to the mobile device from secondary storage. The system includes means for storing the downloaded selected one or more of the content items on the local storage on the mobile device.

In some implementations a non-transitory computer readable storage medium has control logic stored therein for management of local storage on a mobile device. The control logic includes a first computer readable program code that determines available local storage capacity of a mobile device. The control logic includes a second computer readable program code that determines that available local storage capacity meets a threshold available local storage capacity. The control logic includes a third computer readable program code that in response to a determination that the available local storage capacity meets the threshold selects content items to store in local storage based on predetermined criteria. The control logic includes a fourth computer readable program code that downloads the selected content items to the mobile device from secondary storage. The control logic includes a fifth computer readable program code that stores the downloaded selected content items on the local storage on the mobile device.

In some implementations, a method to manage local storage on a device includes determining available local storage capacity of the device. The method includes determining that the available local storage capacity meets a threshold available local storage capacity. The method includes examining metadata associated with one or more content items located in cloud storage. The method includes selecting one or more content items located in cloud storage to store in local storage in response to a determination that the available local storage capacity satisfies a threshold available local storage capacity and based on the metadata examination. The method includes copying the selected one or more content items from cloud storage to the device. The method includes storing the copied selected one or more content items on the local storage on the device.

The method may include storing the copied selected one or more content items on the local storage on the device. The method may include receiving the metadata associated with the one or more content items located in cloud storage. The method may include examining temporal metadata associated with one or more of the content items and metadata associated with frequency of access of one or more of the content items. The method may include examining metadata associated with a strength of relationship between a user of the device and one or more persons associated with one or more of the content items. The method may include scoring the examined metadata according to predetermined criteria.

In some implementations, a system to manage local storage on a device includes one or more processors and instructions encoded in one or more tangible media for execution by the one or more processors. The instructions when executed are operable to determine available local storage capacity of a device. The instructions when executed are operable to determine that the available local storage capacity meets a threshold available local storage capacity. The instructions when executed are operable to examine metadata associated with one or more content items located in cloud storage. The instructions when executed are operable to select one or more content items located in cloud storage to store in local storage in response to a determination that the available local storage capacity satisfies a threshold available local storage capacity and based on the metadata examination. The instructions when executed are operable to copy the selected one or more content items from cloud storage to the device. The instructions when executed are operable to store the copied selected one or more content items on the local storage on the device.

In some implementations, the instructions are further operable to receive the metadata associated with the one or more content items located in cloud storage. In some implementations, the instructions are further operable to examine temporal metadata associated with one or more of the content items and metadata associated with frequency of access of one or more of the content items. In some implementations, the instructions are further operable to examine metadata associated with a strength of relationship between a user of the device and one or more persons associated with one or more of the content items. In some implementations, the instructions are further operable to score the examined metadata according to predetermined criteria.

In some implementations, a system to manage local storage on a device includes means for determining available local storage capacity of a device. The system includes means for determining that the available local storage capacity meets a threshold available local storage capacity. The system includes means for examining metadata associated with one or more content items located in cloud storage. The system includes means for selecting one or more content items located in cloud storage to store in local storage in response to a determination that the available local storage capacity satisfies a threshold available local storage capacity and based on the metadata examination. The system includes means for copying the selected one or more content items from cloud storage to the device. The system includes means for storing the copied selected one or more content items on the local storage on the device.

In some implementations, the system includes means for receiving metadata associated with the one or more content items located in cloud storage. In some implementations, the system includes means for examining temporal metadata associated with one or more of the content items and metadata associated with frequency of access of one or more of the content items. In some implementations, the system includes means for examining metadata associated with a strength of relationship between a user of the device and one or more persons associated with one or more of the content items. In some implementations, the system includes means for scoring the examined metadata according to predetermined criteria.

In some implementations, a non-transitory computer-readable medium includes instructions encoded in one or more tangible media for execution by one or more processors to manage local storage on a device, the instructions when executed by the one or more processors are operable by the one or more processors to perform operations including to determine available local storage capacity of a device. The instructions are operable by the one or more processors to perform operations including to determine that the available local storage capacity meets a threshold available local storage capacity. The instructions are operable by the one or more processors to perform operations including to examine metadata associated with one or more content items located in cloud storage. The instructions are operable by the one or more processors to perform operations including to select one or more content items located in cloud storage to store in local storage in response to a determination that the available local storage capacity satisfies a threshold available local storage capacity, and in response to the metadata examination. The instructions are operable by the one or more processors to perform operations including to copy the selected one or more content items from cloud storage to the device. The instructions are operable by the one or more processors to perform operations including to store the copied selected one or more content items on the local storage on the device.

In some implementations, the instructions are further operable to receive the metadata associated with the one or more content items located in cloud storage. In some implementations, the instructions are further operable to examine temporal metadata associated with one or more of the content items and metadata associated with frequency of access of one or more of the content items. In some implementations, the instructions are further operable to examine metadata associated with a strength of relationship between a user of the device and one or more persons associated with one or more of the content items. In some implementations, the instructions are further operable to score the examined metadata according to predetermined criteria.

In some implementations, the predetermined criteria may include temporal data associated with capture of one or more of the content items. In some implementations, the predetermined criteria may include a frequency of access of one or more of the content items. In some implementations, the predetermined criteria may include a likelihood of access of one or more of the content items. In some implementations, the predetermined criteria may include an importance of one or more of the content items. The importance of one or more content items may be based on a strength of relationship between a user of the device and one or more persons associated with one or more of the content items. In some implementations, the predetermined criteria may include events coincident with one or more of the content items. In some implementations, the predetermined criteria may include a poster of one or more of the content items. In some implementations, the predetermined criteria may include a recipient of one or more of the content items. In some implementations, the predetermined criteria may include tags associated with one or more of the content items. In some implementations, the predetermined criteria may include responses to one or more of the content items. In some implementations, the predetermined criteria may include check-in data associated with one or more of the content items. In some implementations, the predetermined criteria may include geographic and/or location data associated with one or more of the content items. In some implementations, the predetermined criteria may include event data associated with one or more of the content items. In some implementations the predetermined criteria may include events coincident with one or more of the content items. In some implementations, the predetermined criteria may include social affinity between a user of the device and one or more of the content items. In some implementations, the predetermined criteria may include image recognition results associated with one or more of the content items. In some implementations, the predetermined criteria may include a similarity of one or more of the content items to one or more other content items. In some implementations, the predetermined criteria includes whether one or more of the content items have been successfully uploaded to secondary storage. In some implementations, the predetermined criteria may include access of content items from a wearable device. In some implementations, the predetermined criteria may be selected based on a user profile. In some implementations, the predetermined criteria may include one or more of these predetermined criteria. In some implementations, the predetermined criteria may be a combination of two or more of these criteria or other criteria.

BRIEF DESCRIPTION OF THE DRAWINGS

FIG. 9 illustrates an example of a screen display according to some implementations.

FIG. 10 illustrates an example of a screen display according to some implementations.

FIG. 13 illustrates an example of a screen display according to some implementations.

FIG. 14 illustrates an example of a screen display according to some implementations.

DETAILED DESCRIPTION

Figure 1:
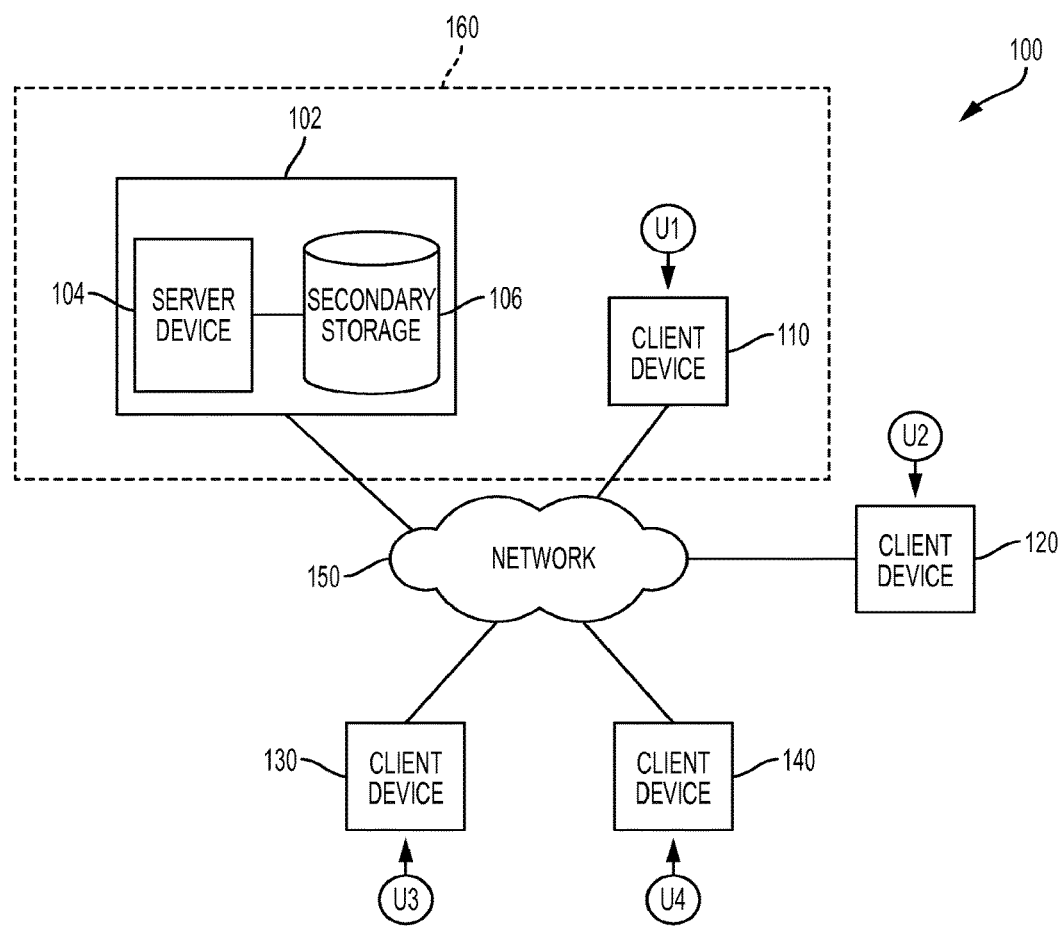
FIG. 1 illustrates a block diagram of an example network environment, which may be used to implement the implementations described herein.

Implementations described herein facilitate storing of content items. In various implementations, a system facilitates upload of content items stored on local storage of a device (e.g., integrated or removable flash memory of a mobile device) to secondary storage (e.g., cloud storage, connected device storage, external local storage, locally networked storage), and selects content items to remove from local storage and/or add to local storage based on predetermined criteria. For example, with the user's consent but without user interaction or input, the system may automatically select content items for removal from the local storage of the mobile device (e.g., old photos that the user would likely delete to make room for newer photos) and download to local storage content items that the user likely will want. For example, with the user's consent but without user interaction or input, the system may automatically select content items on local storage and secondary storage to add or remove from the local storage of the mobile device based on predetermined criteria.

In various implementations, a system facilitates download of content items stored on local storage of a device (e.g., integrated flash memory of a mobile device) from secondary storage (e.g., cloud storage, connected device storage), and selects content items to add or retain on local storage based on predetermined criteria. For example, with the user's consent but without user interaction or input, the system may automatically select content items to add to the local storage of the mobile device (e.g., photos that the user would likely want to have on the local storage of the device).

For example, as local storage becomes full, to free up space, a user of the mobile device can manually identify files to remove from local storage. For example, the user may manually review photos on the device and delete some of the photos stored on the device. As another example, the user may review applications installed on a device and identify applications or application data to remove. In general, management of files on a mobile device can be complicated and time consuming for a user to identify files to keep on his or her mobile device. This is particularly true when the user has more files than can fit on the device. File management becomes even more complicated and time consuming when a user has multiple devices. Some implementations may be used as a complement to or instead of manual review and management by a user.

As described in more detail below, in some implementations, a content item storage system receives content items, for example by a device downloading or creating content items. For example, the user may capture a series of photos at an event on their mobile device. The content items are stored in local storage on the device (e.g., the integrated flash memory that came with the device). The system then determines the available local storage capacity of the device (e.g., less than 1 GB available to store photos on local storage). The system facilitates upload (e.g., transfer of a copy) of content items from local storage to secondary storage. For example, the secondary storage may be another data store in the device, or it may be another data store that is available to the mobile device, such as the storage on another mobile device, a personal computer, a home storage system, a network storage system, a cloud storage system, a photo sharing site, a social network site, etc.

In some implementations, a user has ample local storage, and would like to have additional content items stored on the device, for example by the device downloading content items from secondary storage. For example, the user may have captured photos and uploaded them to secondary storage from another device, such as another mobile device, or a personal computer. The system determines the available local storage capacity of the device (e.g., more than 2 GB available to store photos on local storage). The system facilitates download of content items from secondary storage to local storage. Again, the secondary storage may be another data store in the device, or it may be another data store that is available to the mobile device, such as a personal computer, a home storage system, a network storage system, a cloud storage system, a photo sharing site, social network site, etc.

The system may select content items to remove from or add to local storage based on predetermined criteria. For example, the criteria may include a determination that the user is unlikely to want to access the content items from the local storage on the device (e.g., old photos that the user is unlikely to access when the device is offline). The system then removes the selected content items from local storage. As another example, the criteria may include a determination that the user is likely to want to access some of the content items on local storage on the device (e.g., old photos from an event that the user often refers to). The system may then add the selected content items to local storage.

FIG. 1 illustrates a block diagram of an example network environment 100, which may be used to implement the implementations described herein. It should be understood that this is an illustrative example, and any suitable environment may be used. In some implementations, network environment 100 includes a server system 102, which includes a server device 104 and secondary storage (e.g., a storage database) 106. The server system 102 may provide server functionality for one or more applications. For example, the server system 102 may provide a social networking system, a photo sharing system, an application marketplace, etc. The server system 102 may provide secondary storage functionality 106 to store content items for users. Network environment 100 also includes client devices 110, 120, 130, and 140, which may communicate with each other, for example, via the server system 102 and a network 150, via other servers (not shown) and the network 150, directly with each other via the network 150, and/or directly with each other via other networks (not shown).

In some implementations, the server system 102 may be a mobile device, such as a smartphone, and the client device 110 may be a wearable computer, such as a watch. The network 150 may be, for example, a wireless network such as Bluetooth or WiFi. In this example, the watch client device 110 has local storage and the smartphone server system 102 has secondary storage 106. Thus, the server system 102 also may be a client device 110, 120, 130, 140, such that it is in communication with another server system (not shown) for secondary storage.

In some implementations, a content item storage system 160 may be implemented as shown on a server system 102, including a server device 104, secondary storage 106, and a client device 110. It should be understood that the depiction of client device 110 is illustrative, and a content storage system may be implemented on any of the client devices 110, 120, 130, and 140, or a combination. For example, aspects of the content item storage system 160 may be implemented on one or more of the client devices 110, 120, 130, and 140, and one or more aspects of the content item storage system 160 may be implemented on the server system 102 and/or other server systems (not shown). One or more aspects of the content item storage system may be implemented on a combination of the server system 102 and one or more of the client devices 110, 120, 130, and 140.

In some implementations, a content item storage system 160 for storing content items according to the invention is implemented entirely on a client device 110, 120, 130, and 140. In some implementations, a content item storage system 160 for storing content items according to the invention is implemented entirely on the server system 102 that is in communication with a client device 110, 120, 130 and 140.

For ease of illustration, FIG. 1 shows one block for each of the server system 102, server device 104, and secondary storage 106, and shows four blocks for client devices 110, 120, 130, and 140. Blocks 102, 104, and 106 may represent multiple systems, server devices, and secondary storage devices, locations, and databases. There may be any number of server systems 102, each with the same or different functionality. For example, some implementations may have many more servers 102. There may be associated additional networking, load balancing, security, and other server elements not shown for simplification. Also, there may be any number of client devices 110, 120, 130, and 140. For example, some implementations may have many more client devices 110, 120, 130, and 140 than the four client devices shown. In other implementations, network environment 100 may not have all of the components shown and/or may have other elements including other types of elements instead of, or in addition to, those shown herein.

In various implementations, users U1, U2, U3, and U4 may communicate with each other and may participate in applications using respective client devices 110, 120, 130, and 140. At various times, a given user U1, U2, U3, and U4 may use one or more client devices 110, 120, 130, and 140. At various times, multiple users U1, U2, U3, and U4 may use the same one or more of the client devices 110, 120, 130, and 140. Users U1, U2, U3, and U4 may use respective client devices 110, 120, 130, and 140 to create, send or share content items with each other. For example, users U1, U2, U3, and U4 may also use respective client devices 110, 120, 130, and 140 to take photos and/or capture videos. In various implementations, client devices 110, 120, 130, and 140 may include any types of electronic devices such as mobile phones (e.g., smart phones), wearable computers (e.g., glasses, watches), portable computers, tablets, notebook computers, desktop computers, digital cameras, etc. Such client devices 110, 120, 130, and 140 that are not dedicated digital cameras may include integrated digital cameras and/or video cameras.

In some implementations, client devices 110, 120, 130, and 140 may include wearable computers or computing devices, including any hands-free devices. For example, in some implementations, one or more client devices may include devices that operate with a head-mounted camera, head-mounted eye tracking device, and/or head-mounted display (e.g., HMD). The wearable computer may be implemented, for example, as an integrated device (e.g., glasses) or in other implementations, aspects may be implemented in a head-mounted display (e.g., glasses) and other aspects may be implemented in other devices (e.g. watches, jewelry, items carried in pocket, mobile devices, etc.).

For ease of illustration, four example users U1, U2, U3, and U4 are described. There may be any number of users of the network environment 100 who may be collaborating to communicate between and among each other using the system 102 and creating content items and, for example, participating in social network applications, photo sharing applications, etc. For ease of illustration, four respective example client devices 110, 120, 130, and 140 are described. There may be any number of respective client devices.

Figure 2:
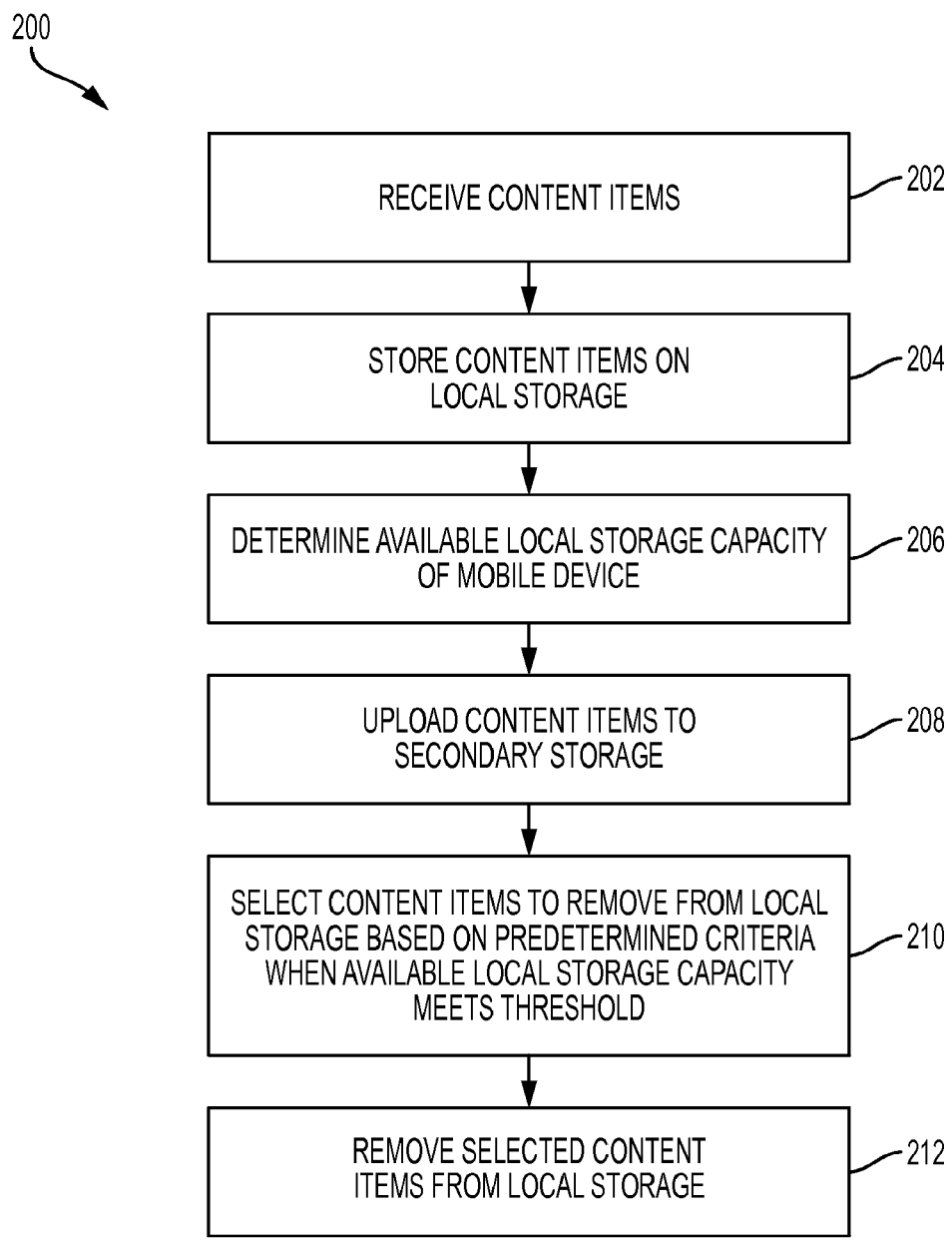
FIG. 2 illustrates an example flow diagram for storing content items, according to some implementations.

FIG. 2 illustrates an example flow diagram for storing content items, according to some implementations. Referring to FIGS. 1 and 2, an exemplary method 200 is initiated in block 202, where a system (e.g., content item storage system 160) receives one or more content items. In this example, the content items may be received on client device 110. In this example, client device 110 is described as a smartphone mobile device, but it should be understood that client device may be any suitable type of client device. Client device 110 may receive a variety of content items and may receive different content items, from the same or different user or users, at various times and in different ways. For example, client device 110 may receive content items that have been created or captured using the client device 110, for example using a still camera, video camera, microphone, or other sensor or combination of sensors. Client device 110 may receive content items that have been downloaded or otherwise communicated over a network, such as a network 150, from a server such as server 102 or other client devices 110, 120, 130, and 140 or peripheral devices such as cameras, recorders, sensors, etc.

Example content items that may be received by a given client device 110 include but are not limited to applications, application data, photos, images, graphics, videos, audio tracks, songs, music, graphics interchange format files (gifs), documents, event information, emails, messages, posts, comments, responses, tags, group join requests, group join acceptances, check-in data, geographic and/or location information, log files, etc. The types of content items available will vary depending on applications running on the client device 110 and on server(s), e.g., server 102, in communication with a given client device 110. Some content items may include other types of content items. For example, in some implementations, a content item may be one or more social network posts that each includes a variety of content items such as photos, text captions associated with the photos, and tags identifying individuals, objects, or places depicted in the photos. In some implementations, content items that include photos may also include content items such as geographic and/or location data displayed in association with the photos. Users may communicate content items in chat and instant messaging sessions. Content items may be received in a variety of ways, for example, from online stores, in email messages, in chat messages, from file repositories, from web sites, from file sharing and messaging applications, etc.

In some implementations, applications related to social networking have social networking features that enable users to receive content items such as posts, comments, messages, photos, and videos, and to associate content items with a group of other users so that a user shares one or more content items with other members of the group. Users who are included in the group may then access such shared content items. The users may be notified of the availability of such shared content items. The users may be presented with the shared content items on a virtual wall or in a list of shared content items that have been associated with groups that a given user participates in.

A "group" as used in the context of the implementations described herein is a social network group. As such, in this context, the term "group" may be used interchangeably with the phrase "social network group." In various implementations, a social network group may be a set of socially connected users in a social network. For example, a social network group may be a group of friends, a group of connections, a group that were invited or attended the same event, and/or a group in the same circle of contacts. In various implementations, a social network system enables users to define and create one or more social network groups. In some implementations, given social network groups may be customized by a user to include one or more of people of a particular category. For example, a social network group may include friends. In another example, a social network group may include family. In another example, a social network group may include co-workers. The particular category of people may vary depending on the particular implementation. Furthermore, the particular categories of people may include other types of people (e.g., classmates, people associated with particular hobby, vocation, profession, project, event, etc.), in addition to these categories listed herein.

In some implementations, to create a group, a user of the social network system may find other users by performing a search, and then add one or more other users to a particular social network group. Note that a particular social network group may include a single person or a group of people. Furthermore, the act of the user adding a particular person to a given group may create a social connection between the user and the particular person. In some implementations, a given user may add another user to one or more social network groups without requiring any actions (e.g., acceptance, acknowledgement, etc.) from the other user. In some implementations, a given user may invite another user to connect socially (e.g., to be added to one or more groups, to be a connection, to be friends, etc.). The recipient of the invitation may respond by accepting the invitation, which creates a social connection. Once the social connection is made, users may engage via various social activities. For example, the users may visit each other's profile pages, follow each other's posts, send messages to each other, receive notifications of each other's activities, etc.

In some implementations, social networking applications enable a user to create a social network group that is a combination of two or more groups of social network groups, which may also be referred to as a supergroup. For example, a given supergroup may be formed from the friends' social network group and the family social network group.

Referring to FIGS. 1 and 2, in block 204, content items received by the client device 110 may be stored in local storage. In some implementations, the local storage is the primary or default data store for a mobile device. In some implementations, the local storage is a flash memory device integral to or in communication with the client device 110. In some implementations, local storage is a disk drive or a flash memory device formatted as a storage device in a format that is recognized by an operating system of client device 110.

In some implementations, received content items are created by the user using the client device 110. For example, content items may be created by a user of the client device 110 using an application program and/or one or more sensors or input devices that are integral to or in communication with the client device 110. For example, a user may type into the client device 110 using an on-screen keyboard or an attached keyboard to create a content item. In some implementations, a user may speak into a microphone in the client device 110 to create a content item. In some implementations, a user may engage a video camera or a still picture camera integral to or in communication with the client device 110 to create a content item. For example, in some implementations, a user may use a video camera in combination with a microphone that is part of or in communication with the client device 110 to create a content item that is or includes a video.

In some implementations, content items are transmitted from a server 102 or another client device (e.g., client device 120, 130, and 140) to client device 110. For example, in some implementations, content items are received by direct or indirect interaction between a social network system and client devices. In various implementations, content items are received by receiving an address or link to content items. In some implementations, a user interacting with a server system 102 uses a given client device (e.g., client device 140) to send content items to the server system 102, which is received by the server system 102 and in turn communicated to another client device 110. In an example implementation, the client device 110 accesses a web page provided by the server system 102, and the web page provides a capability for the user to designate content items to be sent to, and received by, the client device 110.

In some implementations, when content items are received, metadata about content items may be stored. For example, received content items may be associated with a given user who provides content items. For example, in some implementations, the date/time that a content item was received may be stored. In various implementations, metadata may include data about the users and/or the client devices from which content items were received. For example, in some implementations, the name of the user who created or uploaded the content item and geographic and/or location data about the users or the client devices may be stored. As another example, image recognition may be used to identify subjects or locations of photos, and image recognition results or tags may be stored as metadata.

In some implementations, metadata about each content item is stored in a manner accessible to the client device 110. In some implementations, metadata about each content item is stored in local storage. Metadata may be stored, for example, in a database, where each row in a table in the database table includes metadata about a content item. Metadata may be stored, for example, in a text file, such as an XML file. Metadata associated with a content item may be stored, for example, in local storage and in secondary storage. In some implementations, metadata associated with a content item that was or could be stored in local storage is stored in local storage even if the content item itself is not currently stored in local storage.

Referring to FIGS. 1 and 2, in block 206 the available local storage capacity of the local storage on the client device 110 is determined. In some implementations, the total capacity of local storage may be determined by an operating system for the client device 110. In some implementations, the total capacity of local storage may be determined from data that is stored on the local storage. For example, in a FAT-32 formatted data store, the capacity of the data store may be determined by accessing the File Allocation Table stored on the data store. The available capacity of a storage device also may be determined by the operating system and/or from data stored on the client device 110.

In some implementations, an available local storage capacity may be determined based on the space available on the storage device that is currently unused and allocations and/or reservations made by the operating system and/or applications. For example, an operating system may reserve a portion of the available space for applications and for temporary storage. In this case, the available local storage capacity is the available storage space on a local storage device reduced by such reservation or allocation.

In some implementations, an available local storage capacity may be determined based on an allocation for content items. For example, a configuration may indicate that a predetermined amount of storage is reserved for content items. For example, a configuration may indicate that 4 GB are available for storage of content items. If content items currently take up 3 GB, the available storage capacity in this example would be 1 GB. In some implementations, the available local storage capacity for content items may be a specified percentage of total available storage on the device. For example, if total available storage capacity on the device is 2.2 GB, and the specified percentage is 55%, the available storage capacity would be 1.21 GB.

Referring to FIGS. 1 and 2, in block 208 content items from the client device 110 are uploaded to secondary storage. The content items may be uploaded by writing, copying, transferring, or otherwise communicating the content items to secondary storage. In some implementations, content items may be transmitted via email, file transfer protocol (ftp), hypertext transfer protocol (http, https), remote copy (rcp), rsync, block-level copying (e.g., iSCSI, Fibre Channel Protocol (FCP), ATA over Ethernet (AoE), etc.), using a service for file/document sharing, and/or another suitable transmission capability.

The secondary storage may be any type of data store that is integral to or directly connected or available directly or indirectly to the client device 110 through wired or wireless communications networks, or some combination. In some implementations, the secondary storage is a flash drive, such as an SD or micro SD card, that is installed in the client device. In some implementations, the secondary storage is a flash drive that may be inserted and removed from the client device 110. In some implementations, the secondary storage is a USB stick or USB disk drive. In some implementations, the secondary storage is a network storage device that may communicate over a network using such protocols as Bluetooth, Ethernet, TCP/IP, Firewire, etc.

In some implementations, the secondary storage is a cloud storage system that is available over the Internet. In various implementations the secondary storage may be a media sharing site (e.g., photo and/or video sharing site). In an example implementation, the secondary storage may be a social networking service. In some implementations, the secondary storage is presented by a storage replication service or backup service associated with an application on the client device 110. For example, files copied into a specific folder in local storage may be automatically replicated by a storage replication service.

In some implementations, content items are uploaded to secondary storage by enabling a backup application and/or configuring the backup application to back up content items. The backup application may be an application for backup or may be integrated into another application, such as a social networking application, a photo and/or video sharing application, etc. For example, the backup application may be or use a content backup service provided by the operating system of the client device. In some implementations, permission is requested from the user to enable a backup application that is already available on the client device 110 as part of the device operating system or as a separate application or a part of the functionality provided by an application. In some implementations, a user may be asked to download and install an application that is used to upload content items. In some implementations the system automatically uploads the desired content items without any user interaction or input (e.g., an auto-upload feature enabled with user consent).

In some implementations, the upload takes place based on a determination about available local storage capacity. In some implementations, the upload takes place periodically. In some implementations, upload takes place based on a predetermined schedule, such as hourly, daily, weekly, monthly, quarterly, etc. In some implementations, upload takes place based on a predetermined schedule and based on availability of the secondary storage to the client device 110. For example, secondary storage may be available only when the device is connected to a network. In some implementations, if a specified time period has passed and the secondary storage is available to the client device 110, the client device will upload content items. In some implementations, the upload takes place upon a triggering event, such as a storage space error.

In some implementations, the client device 110 will upload all content items that are stored on the client device 110. For example, the entire local storage of the client device may be uploaded, so as to provide a complete backup. In some implementations, only content items that are selected to be removed from local storage are uploaded. In some implementations, only certain types of content items are uploaded. For example, only photos and videos may be uploaded, and not audio tracks or social network messages. In some implementations, only some of the content items may be uploaded at a particular time. For example, a time criteria may be used to determine which content items to upload, such that more recent content items are uploaded first, or older content items are uploaded first. In some implementations, uploads may be limited by bandwidth constraints or time constraints, such that a limited number or amount of content items are uploaded at the time of each upload.

In some implementations, information about some content items (e.g., metadata) may be uploaded instead of the content items. For example, if a copy of an application is available in a marketplace, it may be sufficient to upload data describing the application in order to recover the application from the marketplace if necessary. As another example, if a photo is already available on secondary storage or on another server (e.g., a social networking server), it may be sufficient to upload an identifier for the photo on the social networking server instead of the photo itself.

Referring to FIGS. 1 and 2, in block 210 content items are selected for removal from local storage based on predetermined criteria when the available local storage capacity of the client device meets a threshold available local storage capacity. In various implementations, content items are selected so as to keep the content items on the device that the user is likely to want on the device, and to select for removal content items that the user is not as likely to want to have on the device when the client device 110 is, for example, disconnected from the network 150. This is important for efficient network communication and also so that the user has desired content even if the user is offline, for example because network access is expensive, intermittent, or unavailable. For example, if a user is in a location where data access is unavailable (e.g., aircraft, ocean, a tunnel) or where there is poor network coverage area (e.g., inside a building), or where network access is expensive (e.g., international travel) the user may still want to have certain content items available on their device. In various implementations, the system selects content items using the predetermined criteria to, for example, retain on the device the content items the user will likely want to access offline, and remove content items the user is not as likely to want to access offline.

In some implementations, the predetermined criteria includes whether the content items have been successfully uploaded to secondary storage. For example, if content items have been uploaded to secondary storage, they may be removed from local storage. In various implementations, this criteria may be determined in any suitable fashion. For example, information about where content items are stored may be included in metadata. For example, if the client device 110 has direct or indirect access to secondary storage, the client device may determine whether content items have been successfully uploaded. As another example, if a backup service is used for upload, it may be possible to query the backup service to determine whether particular content items have been successfully uploaded to secondary storage. As another example, a content replication service may be queried to provide an indication about whether content items have been replicated. For some content items, the associated applications may upload all content items to their associated servers and so once upload is complete, all content items have been uploaded.

For example, in some implementations, a social network application may store all data on its associated networked servers and leave only a subset of that data available on a client device 110. Some such applications may allow a client device to mark content items for removal from the client device 110, but those content items remain available for retrieval by a user on the client device 110 or by other access to the networked servers. In some implementations, a reduced size version of an uploaded content item (e.g., a lower-resolution photo or video or a compressed file) is created to replace the full version of the content item in local storage. In some implementations, the reduced size version of the content item may be displayed to the user in a manner that identifies that it is a reduced sized version (e.g., size, color, highlighting, other indicators, etc.). For example, a reduced-size version may have a visual indicator such as a graphic symbol that indicates that it is a reduced size version. For example, a reduced-size version may have a rectangle that is used as a progress bar, and filled in to show the progress made in downloading a full sized version.

In some implementations, the predetermined criteria include temporal data associated with the capture of the content items. For example, for videos that a given user captured at a recent event, the temporal data may include a date/time that the content items were created. For example, this may include metadata in a file (e.g., EXIF data in a photo) or file system data recorded when a file is stored or modified. In some implementations, the predetermined criteria includes a date/time that the content item was first stored, last accessed or last modified on the client device or on other devices meeting a threshold. For example, all content items first stored prior to a threshold date/time may be selected. The threshold date/time may be a date/time in the past that is 1 week, 1 month, 2 months, 3 months, 6 months, 1 year, etc. in the past. For example, content items that were last viewed more than 1 month prior may be selected.

In some implementations, the predetermined criteria include the frequency of access of the content items. For example, a series of photos of a given user's newborn baby that the user views frequently on their device may have a high frequency of access. The frequency of access may be recorded by an application associated with the content items. The frequency of access may be recorded by a storage manager. The frequency of access may be recorded for one or more of multiple client devices accessed by a user. For example, if a given user accesses certain content items frequently on her phone, the user may want to access the same content items on her tablet. In this case the frequency of access takes into account frequency of access on multiple devices. For example, in some implementations, content items viewed less than a number of times during the past month may be selected. For example, in some implementations, content items viewed less than a number of times during the past month may be selected. In each example, the number of times may be, for example, 1 time, 2 times, 3 times, 4 times, 5 times, 10 times, etc.

In some implementations, the predetermined criteria include the method of access of the content items. For example, if a user viewed photos on a particular device (e.g., a specific phone, tablet, personal computer, television, projector, or watch) may be associated with a desire to keep the content items. For example, if a user views certain content items on their watch, the user may want access to those content items at a later time. For example, all content items viewed on the user's watch may be selected. For example, content items viewed on a television may be selected if additional predetermined criteria are met.

In some implementations, the predetermined criteria include the location of access of the content items. For example, if a user views certain content items which located in a particular location, such as at home, at work, in a studio, in a local neighborhood, or when traveling to a new location, the user may want access to those content items at a later time. The user may be required to enable permission for use of location information in this manner. The user may be asked to explicitly provide information identifying locations (e.g., home, work, studio, neighborhood, etc.).

In some implementations, the predetermined criteria include the likelihood of access of the content items. This may be determined in any suitable manner. In some implementations, the likelihood of access is based on past access patterns by a user. In some implementations, the likelihood of access is based on access patterns by a user and/or by other users with social affinity to the user. For example, if other users with a high social affinity to a given user (e.g., the user's spouse) have accessed particular content items, the user may be more likely to access the same content items.

In some implementations, the predetermined criteria include multiple stages, levels, or combinations. For example, a first predetermined criteria may be used. If the content items selected using the first criteria are not sufficient to achieve the desired local storage capacity level, second predetermined criteria may be used. If the content items selected using the second predetermined criteria are not sufficient to achieve the desired level of local storage capacity, a third criteria may be used, etc.

In some implementations, content items are scored, and the score is used to rank content items, such that the content items with the highest scores are selected to be retained (or selected to be added to local storage). Content items with lower scores are replaced by placeholder copies. Content items with the lowest scores are selected for removal.

In some implementations, the predetermined criteria include threshold criteria for including/excluding content items from selection and ranking criteria for prioritizing content items to be including or excluding from selection. The criteria for ranking content items are used to prioritize which content items should be removed to achieve a desired level of local storage capacity. In an example implementation, the criteria may include the threshold requirement that content items be uploaded to secondary storage, and that content items be excluded from selection if they were accessed in a predetermined time period (e.g., the past week, the past month, within a number days from the current day, etc.). Rather than select all content items that meet this criteria, the predetermined criteria also may use the ranking criteria of last access time. The ranking criteria may be used to select and remove the least recently accessed content items until the desired available local storage capacity level is reached.

In some implementations, the predetermined criteria is based at least in part on social affinity. For example, photos shared by someone with a strong social affinity to the user, such as the user's spouse, sibling, or close friend may have a high social affinity. In some implementations, social affinity is determined by at least one criterion selected from the group of a poster of a content item, a recipient of a content item, tags added to a content item, a response to a content item, check-in data associated with a content item, geographic and/or location data associated with a content item, event data associated with a content item, image recognition results, and similarity of content items to other content items.

In some implementations, the predetermined criteria include events coincident with the content items. For example, if content items are associated with an event, information about the event may be used as a criteria for including/excluding those content items from selection. For example, content items related to an event that occurred some time ago may no longer be relevant to a user.

In some implementations, the predetermined criteria include the importance of the content items to the user. In some implementations, the importance of the content items is based on the strength of the relationship between a user of the device and one or more persons associated with the content items. The one or more persons are referred to as a target user.

In some implementations, the association between a particular content item and a target user is stored in a social network database, for example secondary storage 106 or another data store or database, so that the client device 110 may identify which content items are associated with a target user by querying secondary storage 106.

The client device 110 may use predetermined criteria to associate content items with the target user. Any suitable criteria may be used. In some implementations, the criteria may be specified by the user. For example, the user may specify as the criteria that content that is posted, received and/or shared with one or more designated people or groups should not be removed. In some implementations, the criteria may be predetermined by an administrator of the client device 110. In some implementations, the predetermined criteria include social affinity. In various implementations, the predetermined criteria include filtering. In an example implementation, the predetermined criteria include filtering types of content items (e.g., photos, videos, posts, etc.). In an example implementation, the predetermined criteria include filtering more recent content items (e.g., items posted or viewed after a certain date/time) so that only older content items, for example, are selected to meet the criteria.

In various implementations, one or more predetermined criteria may include a determination that one or more photos include an image of a given target user. For example, photos that include a given target user (e.g., spouse of a user, other family member of a user, or close friend of a user) may not be selected for removal. In some implementations, the client device 110 may utilize a recognition technique to determine if a given target user is in a given photo. In various implementations, the client device may use one or a variety of suitable recognition techniques to recognize faces, landmarks, objects, etc. in photos. Such recognition techniques may be integral to the client device 110 or available through communication with a server system 102. For example, the techniques may be implemented in software of the client device 110 (e.g., the operating system or applications), built into hardware of the client device, provided by the server system 102, or some combination. The client device 110 may access recognition techniques provided by software and/or hardware that is external to the client device 110 and that the client device 110 accesses. In some implementations, text analysis may be applied to determine the subject of content items that include or are associated with text. In some implementations, metadata may include information about the subject or features of content items. The metadata may include results of recognition techniques, text analysis, and tags associated with content items. The predetermined criteria may include the extent that photos include individuals having a degree of social affinity with a target user.

For example, in some implementations, one or more predetermined criteria may include a determination that one or more photos include an image of a given target user and/or that the target user is tagged in one or more photos. A tag may be used to determine that a photo includes an image of a target user.

In some implementations, one or more predetermined criteria may include a determination that one or more photos were captured during an event that the target user attended. In various implementations, an event may be any meeting or gathering of people in a geographic location. Such events may include conventions, parties, celebrations, meals, classes, meetings, ceremonies, conferences, etc. In some implementations, an event may include virtual events (e.g., web conference, conference calls, etc.) In various implementations, the system may determine that the target user has attended a particular event from a list of event participants. The target user may be added to a list of event participants after having registered, RSVPed, or purchased tickets for an event, etc.

In some implementations, the importance of events may be determined. For example, events associated with more social activity and/or more content items may be more important. For example, events attended by other users who have high social affinity may be considered important. For example, content items associated with events that were attended by individuals with lower social affinity with the user may be selected for removal.

In some implementations, one or more predetermined criteria may include a determination that one or more photos are attached to a post of a social networking, photo sharing or messaging application, and that a target user is associated with the post. In some implementations, the target user may be associated with the post by being a recipient of the post and/or being mentioned in the post. In various implementations, the target user may be associated with the post by being in one or more photos attached to the post. In some implementations, the system may utilize a recognition technique to determine if the target user is in one or more of the photos and/or through tags associated with a photo.

In an example implementation, one or more predetermined criteria may include a determination that one or more photos are attached to a post and the target user is included in one or more of the attached photos. In another example implementation, one or more predetermined criteria may include a determination that posts are made from geographic location(s) frequented by the target user. In another example implementation, one or more predetermined criteria may include a determination that posts are made about subjects of interest to the target user.

In some implementations, one or more predetermined criteria may include a determination that one or more photos are directly shared with the target user. In various implementations, one or more predetermined criteria may include a determination that one or more content items are shared by one or more other users who have a social affinity that meets a predetermined social affinity threshold. For example, social affinity may be based on a number or frequency of information exchange between the target user and the one or more other users. For example, social affinity may be based on a relationship between users, such as included in a contact or group, friend-of-a-friend relationship, in a contact or group of an individual in a contact or group, etc. For example, social affinity may be based on a location of users. Social affinity may be based on users have shared interests.

For example, social affinity may be based on one, two, or a combination of some or all of these and other criteria.

In an example implementation, one or more predetermined criteria may include a determination that a photo album containing one or more photos is manually associated with a photo library of the target user.

In various implementations, the predetermined criteria include content items made available to one or more groups. In some implementations, the predetermined criteria include content items made available to one or more groups within a specified time range. For example, content items may be shared with members of a group, and a social network application may determine which content items have been shared with a group or groups that the target user belongs to. In some implementations, the predetermined criteria include content items made available to one or more groups in the time since the last time that content items were selected for this target user. For example, a target user may request that content items be selected at a time frequency (e.g., once a week, once a month, a number of days, etc.) and the system 102 may determine which content items have been shared with a group or groups that the target user belongs to and were received by the system since the last time content items were selected.

In some implementations, the predetermined criteria includes at least one criterion including but not limited to a poster of content items, a recipient of content items, tags added to content items, responses to content items, check-in data associated with content items, geographic and/or location data associated with content items, event data associated with content items, image recognition results, and similarity of content items to other content items.

In some implementations, the predetermined criteria may be a result of an action or actions taken by the target user or an action or action taken by another user, and/or a combination. For example, the target user may have responded to a content item, or expressed approval or interest in a content item. As another example, the target user may have clicked on a link associated with a content item, such as to request more information about a content item.

In various implementations, when the predetermined criteria are based on social affinity, a scoring technique may be used to calculate a social affinity score based on information associated with users and content items. For example, a higher social affinity score may be indicative of a closer and/or more direct relationship between a target user and a target user and/or between a target user and a content item. In various implementations, a social affinity score may be indicative of the degree of connection between a target user and another user and/or a target user and a content item. In some implementations, a social affinity score may be calculated based on a direct relationship, an indirect relationship, and/or a combination of one or more direct and/or indirect relationships between a target user and a content item. In some such implementations, a more direct relationship would result in a higher social affinity score than an indirect relationship, and the more indirect the relationship, the lower the score. In some such implementations, a one-way relationship, for example, in which one user shares with the other, but not vice-versa, would result in a lower social affinity score than a bi-directional relationship.

In various implementations, a social affinity score may be determined at least in part by a relationship between a target user and a content item. In various implementations, a social affinity score may be determined at least in part by a relationship between a target user and another user, where the other user has a relationship to one or more content items. In some implementations, a social affinity score may be determined at least in part by a relationship between content items and other content items.

Illustrative examples of social affinity between a user and content items in various implementations include but are not limited to: content items received from a user, content items directed to or sent to a user, content items received from a location where the user was or is located, content items that are or include tags added to content items that reference the user, content items that are responses to content items made by a user, content items that are check-in data submitted by a user, content items that are received about a subject or location in which the user expressed interest, content items received about a subject or location in which the user had submitted similar content items, etc. For example, social affinity between a target user and content item may be determined based at least in part on whether the target user submits a content item. As another example, social affinity between a target user and content item may be determined based at least in part on whether the target user is a subject of a content item.

In some implementations, social affinity between a target user and a content item may include social affinity between the target user and another user, where the other user has a relationship with a content item. Illustrative examples of social affinity between a user and another user include but are not limited to: members of the same group, sharing of content items between the target user and another user, the target user and another user designated as friends, the target user and another user have friends in common, the target user and another user have friends who are friends, the target user and another user have group members who are in the same group, the target user is designated as a follower of another user or vice-versa, etc. In some implementations, a social affinity relationship between a target user and a content item is determined based at least in part on whether the content item is posted by a member of a group that the target user belongs to.

In some implementations, social affinity between a target user and content items may include social affinity between content items and other content items. Illustrative examples of social affinity between content items and other content items include but are not limited to: tags added to content items, responses to content items, check-in data associated with content items, geographic and/or location data associated with content items, event data associated with content items, image recognition results, content items shared with the same group, content items with similar associated text or other features, etc. For example, social affinity between a content item and another content item may be determined when a content item is similar to a content item posted by the target user.

In some implementations, the system runs a query or queries on all or a subset of content items in local storage to determine which content items are to be associated with a target user. In some implementations, a social affinity score is determined for the target user and each of a plurality of content items. In various implementations, the predetermined criteria includes a social affinity score threshold.

In some implementations, the system may present the user with a user interface that allows the user to specify one or more predetermined criteria. For example, the user may be able to select that oldest items should be removed first, except that items associated with specific users and events should not be removed or should be added. For example, a user may specify a time range (e.g., content items newer than 1 week, 2 weeks, 1 month, 2 months, etc. should be kept) and a list of specific users such that content items that are older but are associated with the users on the list should be kept.

In some implementations, the system may select additional content items to include or exclude in the selection for removal based on content items already included or excluded. In some implementations, the subject matter of selected or excluded content items is determined, and additional content items related to the determined subject matter of the included or excluded content items are also selected or excluded. For example, if content items selected for removal are about trees, additional content items about trees may be selected for removal as well. Such additional content items may include photos, drawings, text, or posts containing or about leaves, trees, fruit, forests, etc. As another example, if content items excluded for selection for removal (that is, selected to keep) are about cats, additional content items about cats may be excluded. Such additional content items may include photos, drawings, text, or posts, containing or about cats, cat food, cat food bowls, etc. As another example, if content items selected for removal are about an event, additional content items about the event may be selected. Such additional content items may include photos, drawings, text, or posts, containing or about the location of the event, the activities taking place at the event, other participants in the event, posts or other messages sent from the event (e.g., popular messages), etc.

In some implementations, the subject matter of content items may be determined from captions or text accompanying an image, system applied tags, use tags, or through image or object recognition. The subject matter of content items included in a composition may be matched with other content items available to the user on the server system 102, or with stock content items that have tags or that have been recognized.

Referring to FIGS. 1 and 2, in block 212, selected content items are removed from local storage. In various implementations, the content items are automatically removed with user consent or without any user interaction or input. In some implementations, user confirmation may be requested prior to deleting content items. In some implementations, permission may be requested the first time content items are deleted. The content items may be removed in any suitable manner. In some implementations, selected content items may be deleted from a file system. In some implementations, selected content items may be marked for deletion by an application that manages the content items. For example, social network content items may be marked for deletion from local storage by a social network application. As another example, photos may be marked for deletion from local storage by a photo sharing application.

In some implementations, the client device may take the additional step of excluding from selection content items that were previously excluded. For example, if a user previously indicated that certain content items (e.g., specific photos) should be excluded from selection (e.g., not deleted), the system 160 may exclude these content items in the future. The system 160 may store user preferences so that a user is not asked about the same content items at a later times. For example, in some implementations a user may tag content items as favorites or assign a star indicator or color indicator to them, and such content items will then be excluded from selection and remain on the local storage of the device.

In some implementations, a placeholder copy of a content item is created and stored on the device instead of removing the content item. This placeholder copy has the benefit of allowing the user to retain portions of the original content items or an identifier and/or other information about the original content item, which can be used as a placeholder if the secondary storage is not available. For example, a placeholder content item may have a smaller size in local storage than the original content item. A smaller sized version may be created in any suitable manner, for example by changing characteristics of the content item, deleting portions of the content item, applying compression techniques, etc. For example, a low-resolution placeholder image may be used to replace a high resolution image, a lower-resolution video may replace a high definition video, a content item containing text may be compressed with a suitable compression technique, etc. In some implementations, placeholder content items include smaller-sized replacement content items that are created for content items that are similar to other content items by storing the differences between content items. For example, if a number of photos are similar to a first photo, the differences between them may be stored instead of the entire original content items.

In creating the placeholder content item, the system 160 may take into account, for example, the characteristics of the client device 110. For example, for images, the system 160 may take into account the display resolution of the client device 110. If a photo has a higher resolution than may be viewed on the device, the system 160 may reduce the photo resolution to match the actual resolution of the client device 160. The user may not initially notice a difference between the placeholder and the original if the resolution is matched to the actual resolution of the client device 160. For example, if the original version of a photo was taken and stored at a resolution of 5760×3600 pixels, for example, based on a camera setting or on camera resolution, and the device screen display resolution is, for example, 1920×1200 pixels, a placeholder version may be created for the photo with a reduced resolution of 1920×1200 pixels, which resolution for the placeholder version matches the device screen display. When the placeholder version is viewed by the user on the device display, the user initially would not be able to tell the difference between the original and the placeholder. If the user tried to zoom in, the resolution reduction then may become apparent.

When a user selects a placeholder content item, the original content item may be downloaded and replace the placeholder content item. In some implementations, the replacement of original for placeholder may be made without specific user direction. For example, the user may choose to look at a photo that has been replaced with a lower resolution placeholder image, the user starts by looking at the placeholder, the system determines the user is viewing the placeholder image, the original image is downloaded and the placeholder image is replaced with the original. By the time that the user decides to interact with the image, for example to zoom in, when the lower resolution characteristics of the placeholder would have become apparent, the download of the original is complete and the user is then viewing and may interact with the original image. This process may happen so quickly that the user may not notice that the image they chose to interact with was originally a lower resolution placeholder image and then transitioned to the download of the original image.

Likewise, a low resolution video may replace a high resolution video, or a video may be replaced with a smaller file size version of the video with a slower frame-rate, encoded with a different (e.g., lossy or with different loss characteristics) encoding scheme, etc., or with just an initial portion of the video. For example, for a 5-minute video, only the first 30 seconds of the video may be retained in local storage, encoded so as to minimize storage space. If the user chooses to play the video, the placeholder can be played unless/until the original video is available to be provided to the user from the secondary storage, the server 160, or copied back to the user's device and used to replace the placeholder content item.

In some implementations, the placeholder content item does not have the same appearance as the original content item. For example, the system may display a thumbnail image that has a much smaller resolution than the original. The thumbnail image may be sufficient for the user to identify the context of the original image but not the details. If the user wants to see the image, the user may select it and the system may provide the original image from secondary storage (if connected). Videos may be replaced with a still image, or a much smaller resolution image with or without audio. By clicking on the placeholder, the user signals interest in the content item, and a higher resolution or larger size image of the same content item may be downloaded from secondary storage and made available to the user if the user's client device 110 is in communication with the secondary storage.

In some implementations, context may be used to determine which content items to select to retain on the client device. For example, if a user has a number of related content items, such as content items associated with a particular date/time or event, or person, a first number of content items associated with that date/time or event may be retained on the client device 110. If the user requests the retained content items, the system 160 copies back to the client device 110 from secondary storage the other content items related to that context.

In some implementations, one or more steps of determining 206, uploading 208, and selecting 210 are performed periodically. In some implementations, one or more steps of determining 206, uploading 208, and selecting 210 are performed when a preconfigured amount of content items has been received. In some implementations, one or more steps of determining 206, uploading 208, and selecting 210 are performed upon a triggering event such as an operating system or application notification related to storage availability, and/or a request by a user. In some implementations, storage management and the steps 204-212 may be initiated by a determination of storage availability such as described below with reference to FIG. 7.

In some implementations, a triggering event for one or more of the steps 204-212 may be the passage of a predetermined time interval, such that one or more of steps 204-212 are performed periodically. In some implementations, the triggering event may be determined by timer logic. In various implementations, the time interval may be a whole or fractional number of hours, days, weeks, months, or years. In an example implementation, a triggering event occurs once every month, such that the client device may perform the steps 204-212 for a target user at least once a month, and every month the local storage of the target user is maintained. In various example implementations, the client device may perform the steps 204-212 once an hour, once every two hours, once every four hours, once a day, once every two days, once every three days, once every four days, once a week, once every two weeks, once every three weeks, once a month, once every two months, etc.

In some implementations, steps 208-212 are performed when available local storage capacity is determined in step 206 to meet a threshold (e.g., is below a predetermined threshold level). In some implementations, the determination of local storage capacity 206 is performed periodically, and the uploading 208 is performed on an ongoing basis. When a determination 206 is made that available local storage capacity meets the threshold storage capacity, then content items may be uploaded 208 if not already uploaded and selected 210 for removal based on the predetermined criteria. Removal of content items 212 may be performed immediately after the content items are selected or sometime later.

In various implementations, a triggering event may be receipt of a threshold amount of content items. For example, the steps may be integrated into a camera application, such that when new photos are taken, a determination of available local storage capacity is undertaken. In various implementations, the threshold number of content items may be a number of photos, videos or images. In various implementations, the threshold amount of content items may be receipt or posting of a number of posts or comments.

Figure 3:
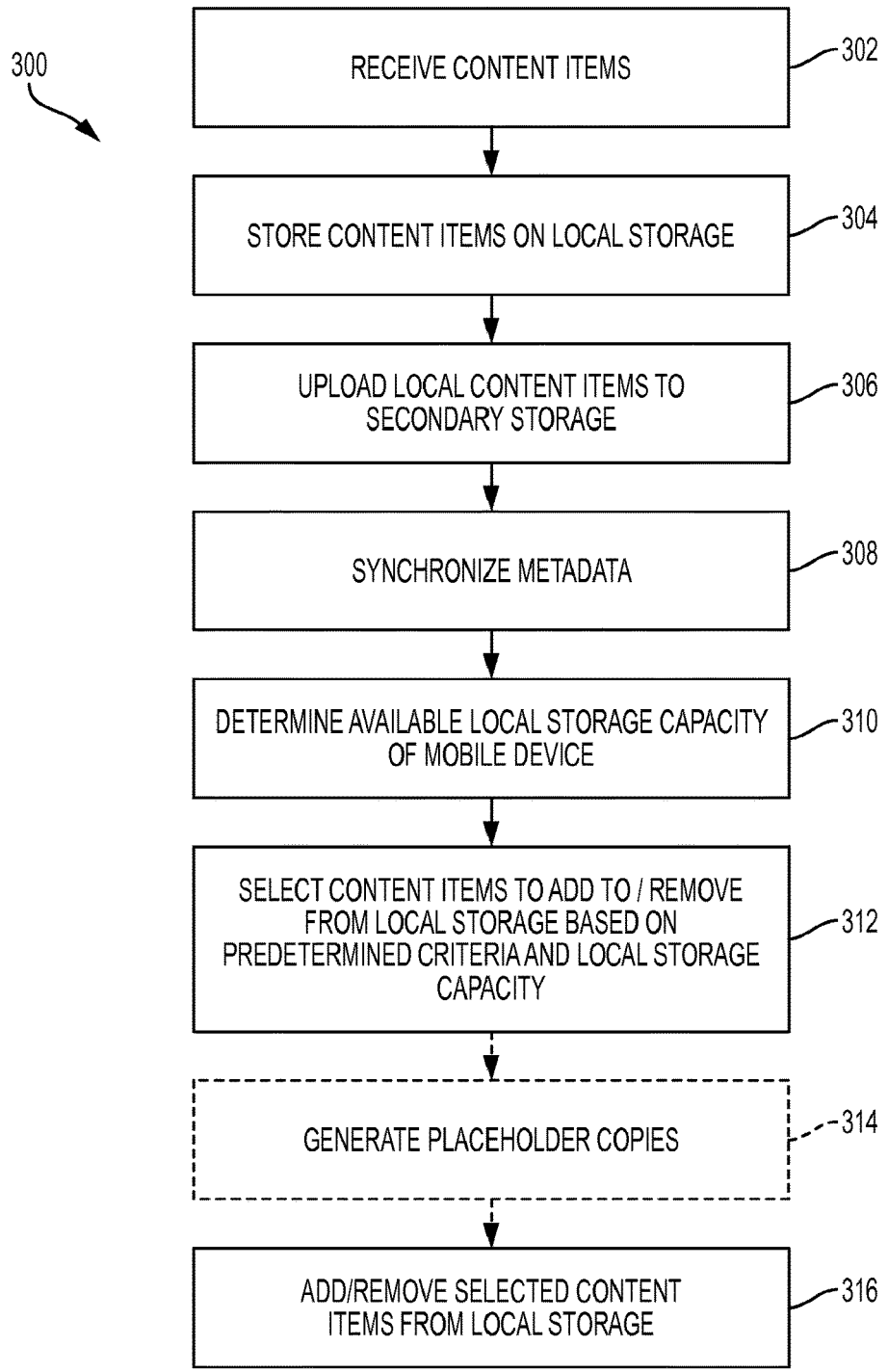
FIG. 3 illustrates an example flow diagram for storing content items, according to some implementations.

FIG. 3 illustrates an example flow diagram for storing content items, according to some implementations. For example, a system may synchronize a client device 110 with secondary storage so that content items may be selected to be added or removed from local storage based on predetermined criteria such as the predetermined criteria described herein. For example, content items created with other devices may be synchronized with secondary storage, and content items uploaded to secondary storage by other devices may be added to local storage of client device 100 based on the available local storage capacity and predetermined criteria.

In the example method 300, content items are received. As described with respect to FIG. 2, the client device 110 may be any suitable client device, a client device 110 may receive any of a variety of content items and may receive different content items from one or more different users at various times and in different ways, and using different devices.

In block 304, content items received by the client device 110 may be stored in local storage. As described, local storage may be the primary or default data store for a mobile device.

In block 306, content items in local storage are uploaded to secondary storage. As described, content items may be uploaded by writing, copying, transferring, or otherwise communicating the content items to secondary storage. Secondary storage may be any type of data store that is integral to or directly connected or available directly or indirectly to the client device 110 through wired or wireless communications networks, or some combination. Secondary storage may be available using an application programming interface (API), such as a Simple Object Access protocol (SOAP) or a Representational State Transfer (REST) API. In some implementations, the secondary storage is a cloud storage system that is available over the Internet. In various implementations the secondary storage may be a media sharing site (e.g., photo and/or video sharing site). In an example implementation, the secondary storage may be a social networking service and/or a photo and/or video service of a social networking site. In some implementations, the secondary storage is presented by a storage replication service or backup service associated with an application on the client device 110. For example, files copied into a specific folder in local storage may be automatically replicated by a storage replication service. Copying to secondary storage assures that copies of the content items are available on the secondary storage.

Uploading content items to secondary storage may also include uploading metadata associated with uploaded content items. Metadata may be communicated as part of the uploading process, or may be communicated separately, by communication of a document or records of metadata associated with content items. For example, metadata may be communicated as part of a communication protocol when copying content items.

In various implementations, receiving content items 302 and storing content items on local storage 304 may take place on an ongoing basis, as content items are received or generated. Uploading local content items to secondary storage 306 may take place periodically, upon receipt of content items, upon receipt of a threshold number of content items, upon receipt of a threshold size of content items, and/or some combination, or in any other suitable manner.

Simultaneously or separate from the uploading of local content items to secondary storage 306, metadata for the content items local storage and secondary storage is synchronized 308. As a result of metadata synchronization, a copy of the metadata associated with content items is available on local storage and secondary storage. The synchronization of metadata associated with content items allows the client device 110 to have metadata information about content items that are in local storage and content items that not in local storage but are available on secondary storage. The synchronization may also allow secondary storage to have metadata associated with any content items not already uploaded to secondary storage. The metadata may include metadata associated with content items that have been uploaded to secondary storage by the client device, and content items that have been uploaded by other devices to secondary storage.

The metadata may include the time/date or location that a content item was created or captured (e.g., EXIF data in a photo), file system data recorded when a file is stored or modified, a date/time that the content item was first stored, last accessed or last modified on the client device or on other devices, the date/time that a content item was received, data about the users and/or the client devices from which content items were received, such as the name of the user and geographic and/or location data about the users or the client devices, tags or other information about the subjects or locations of the content items, and any other suitable metadata that may be used for the purposes of identifying content items and determining whether to store content items on local storage.

In some implementations, metadata includes indicia of actions by a user of a client device on a content item. Actions may include changes/edits to the content item, deletes, sharing, inclusion in albums, collections, stories, collages, etc.

For example, in some implementations, an application may include image editing capability. This capability may include any or a combination of image editing capabilities, including without limitation, for example, adding text or graphics to an image, erasing portions of an image, scaling, cropping, changing resolution, rotation, color enhancement, filtering, etc. In some implementations, changes to an image may be recorded in metadata associated with a content item, so that that there is a record of the changes made. The changes recorded in metadata associated with the content item are synchronized along with other metadata associated with the content item. The changes then may be available on all devices that have synchronized metadata with the secondary storage.

In some implementations, a method for distributing edits to a content item, may include synchronizing metadata associated with a first content item between a first device and secondary storage, wherein the metadata associated with a first content item includes specification of edits to the first content item. The method may include selecting the first content item to be copied from secondary storage to local storage based on predetermined criteria. The method may include copying the first content item from secondary storage to local storage in response to the selecting, and presenting the first content item to a first user with the edits specified in the metadata. The method may further include generating edits to the first content item based on input from the first user. The method may further include generating edits to the first content item based on input from a second user. The method may further include storing edits to the content item as metadata associated with the first content item. In some implementations, the edits may be generated using a second device. In some implementations, the method may include synchronizing metadata associated with the first content item between the second device and the secondary storage.

In some implementations, a system for distributing edits to a content item may include one or more processors and logic encoded in one or more tangible media for execution by the one or more processors and when executed operable to perform operations. The operations may include synchronizing metadata associated with a first content item between a first device and secondary storage, wherein the metadata associated with a first content item includes specification of edits to the first content item. The operations may include selecting the first content item to be copied from secondary storage to local storage based on predetermined criteria. The operations may include copying the first content item from secondary storage to local storage in response to the selecting. The operations may include presenting the first content item to a first user with the edits specified in the metadata.

In some implementations, the operations may include generating edits to the first content item based on input from the first user. In some implementations, the operations may include generating edits to the first content item based on input from a second user. In some implementations, the operations may include storing the edits to the content item as metadata associated with the first content item. In some implementations, the edits may be generated using a second device. In some implementations, the operations may include synchronizing metadata associated with the first content item between the second device and the secondary storage.

In another example, deletion of a content item may be recorded in metadata. In addition to deleting the content item, metadata is recorded indicating that the image was deleted. When the metadata is synchronized with other devices, those devices, can then delete the content item as well. In that way, the deletion is communicated to all client devices that synchronize metadata with secondary storage.

In some implementations, a method for deleting a content item may include deleting a first content item from a first device. The method may include storing a specification of the deletion of the first content item in metadata associated with the first content item. The method may include synchronizing metadata associated with the first content item between the first device and secondary storage, wherein the metadata associated with a first content item includes specification of deletion of the first content item. The method may include synchronizing the metadata associated with the first content item between a second device and secondary storage, wherein the metadata associated with a first content item includes the specification of deletion of the first content item. The method may include deleting the content item from the second device in response to the specification of deletion.

In some implementations, a system for deleting a content item may include one or more processors and logic encoded in one or more tangible media for execution by the one or more processors and when executed operable to perform operations. The operations may include storing a specification of the deletion of the first content item in metadata associated with the first content item. The operations may include synchronizing metadata associated with the first content item between the first device and secondary storage, wherein the metadata associated with a first content item includes specification of deletion of the first content item. The operations may include synchronizing the metadata associated with the first content item between a second device and secondary storage, wherein the metadata associated with a first content item includes the specification of deletion of the first content item. The operations may include deleting the content item from the second device in response to the specification of deletion.

Referring again to FIG. 3, in block 310, the system determines the available local storage capacity of the local storage. In some implementations, the total capacity of local storage may be determined by an operating system for a given client device 110. In some implementations, the total capacity of local storage may be determined from data that is stored on the local storage. For example, in a FAT-32 formatted data store, the capacity of the data store may be determined by accessing the File Allocation Table stored on the data store. The available capacity of a storage device also may be determined by the operating system and/or from data stored on the client device 110.

In some implementations, the available local storage capacity may be determined based on the space available on the storage device that is currently unused and allocations and/or reservations made by the operating system and/or applications. For example, an operating system may reserve a portion of the available space for applications and for temporary storage. In this case, the available local storage capacity is the available storage space on a local storage device reduced by such reservation or allocation.

In some implementations, the available local storage capacity may be determined based on an allocation for content items. For example, a configuration may indicate that a predetermined amount of storage is reserved for content items. For example, a configuration may indicate that 4 GB are available for storage of content items. In this example, if content items currently take up 3 GB, the available storage capacity in this example would be would be 1 GB.

In block 312, the system selects content items to add to or remove from local storage based on predetermined criteria and available local storage capacity. In some implementations, the predetermined criteria is the creation date. Recently created or added items are selected to be added to local storage, and earlier content items are selected to be removed.

In some implementations, each content item is scored based on the predetermined criteria. Content items are selected to be included in local storage based on the score, with the highest scoring content items included up to a threshold available storage capacity. Content items with a lower score are selected to be replaced by a placeholder or removed from local storage. Content items may be selected to be added or retained in local storage in the form of a placeholder copy. For example, in some implementations, a portion of the available storage space may be allocated to full-size copies of content items, and a portion of the available storage may be allocated to placeholder copies of content items.

In block 314, optionally, placeholder copies of content items may be generated. A placeholder copy is a copy of a content item that may be stored in the local storage as a substitute for the content item. In some implementations, the placeholder copy has a smaller size than the actual content item. A placeholder copy may be intended to be a temporary substitute, used only until the original content items is retrieved from secondary storage. A placeholder copy may be intended to be a substitute that is sufficient for most purposes or uses of the content item.

In some implementations, a placeholder copy of a content item is created and stored on the device instead of removing the content item. This placeholder copy of a content item has the benefit of allowing the user to retain portions of the original content items or an identifier for the original content item if the secondary storage is not available. For example, a placeholder copy may have a smaller size in local storage than the original content item. A smaller sized version may be created in any suitable manner, for example by changing characteristics of the content item, deleting portions of the content item, applying compression techniques, etc. For example, a low-resolution placeholder image may be used to replace a high resolution image, a lower-resolution video can replace a high definition video, a content item containing text can be compressed with a suitable compression technique, etc. In some implementations, placeholder content items include smaller-sized replacement content items that are created for content items that are similar to other content items by storing the differences between content items. For example, if a number of photos are similar to a first photo, the differences between them may be stored instead of the entire original content items.

In creating the placeholder copy of a content item, the system 160 may take into account, for example, the characteristics of the client device 110. For example, for images, the system 160 may take into account the display resolution of the client device 110. If a photo has a higher resolution than can be viewed on the device, the system 160 may reduce the photo resolution to match the actual resolution of the client device 160. The user may not initially notice a difference between the placeholder and the original if the resolution is matched to the actual resolution of the client device 160.

In some implementations, the placeholder content item does not have the same appearance as the original content item. For example, the system may display a thumbnail image that has a much smaller resolution than the original. The thumbnail image may be sufficient for the user to identify the context of the original image but not the details. If the user wants to see the image, the user may select it and the system may provide the original image from secondary storage. Videos may be replaced with a still image, or a much smaller resolution image with or without audio. By clicking on the placeholder, the user signals interest in the content item, and a higher resolution or larger size image of the same content item may be downloaded from secondary storage and made available to the user if the user's client device 110 is in communication with the secondary storage.

A placeholder copy may include a location in secondary storage of an associated content item that will allow a copy of the actual content item to be retrieved from secondary storage. A location (e.g., in secondary storage) of a content item may be retained in metadata.

A placeholder copy may be generated for a content item that is located in secondary storage, such that the placeholder copy may be selected to be added to local storage. In this way, local storage will have a placeholder copy of the content item.

In block 316, content items selected to be added to local storage are copied from secondary storage, and content items selected to be removed from local storage are removed. In some implementations, content items that are removed may be replaced by a placeholder copy. In some implementations, a placeholder copy may be added to local storage rather than a full size content item.

Metadata for content items that are removed may be retained in local storage on the client device, so that the user may be made aware of the removed content items and easily retrieve them when the client device is in communication with secondary storage. In some implementations, the removal may be transparent to the user, such that the user is not aware of which content items are stored in local storage and which are only in secondary storage.

Figure 4:
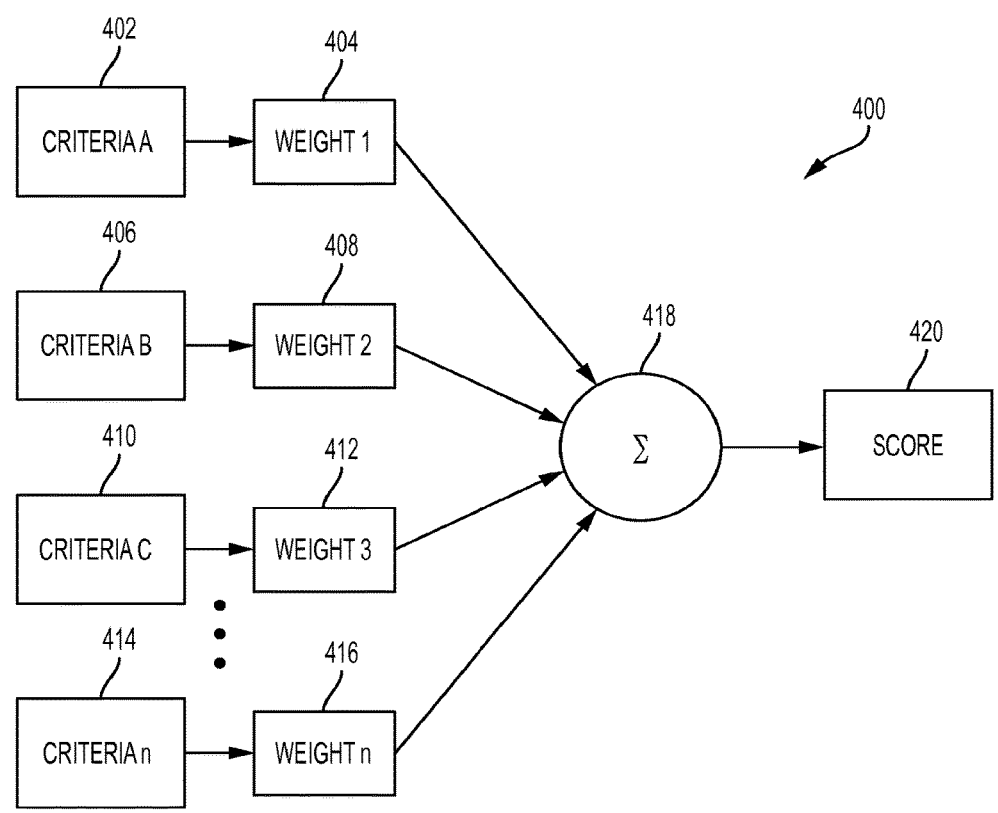
FIG. 4 illustrates an example flow diagram for scoring content items, according to some implementations.

FIG. 4 illustrates an example flow diagram for scoring content items, according to some implementations. Referring to FIG. 4, content items may be selected to be removed from local storage or added to local storage based on predetermined criteria and local storage capacity. In some implementations, each content item is scored based on the predetermined criteria, and the highest-scoring content items are selected for storage in local storage. Scoring may include evaluating a small or large number of criteria, such as 1 predetermined criteria, 2 predetermined criteria, 4 predetermined criteria, 10 predetermined criteria, etc.

In some implementations, a scoring system 400 is used to assign a score to each content item. The scoring system 400 may be implemented in software or in hardware. The scoring system 400 may be used to evaluate each content item for each of a number of predetermined criteria. Each predetermined criteria is weighted (e.g., multiplied by a weight), and the weighted predetermined criteria are summed, with a resulting score. For example, in some implementations, a first criteria, Criteria A 402 is weighted with Weight 1 404. A second criteria, Criteria B 406 is weighted with Weight 2 408. A third criteria, Criteria C 410 is weighted with Weight 3 412. The last criteria, Criteria n 414 is weighted with Weight n 416. It should be understood that the number of criteria shown is demonstrative, and there may be any number of additional criteria included in the score. For example, just a few examples, each of the Criteria (e.g., Criteria A 402, Criteria B 406, Criteria C 410, and Criteria n 414) may include one or more of a user's behavior, social affinity, detection of events, image, video, or text content, similarity to other content items, metadata, dates and times, and such other criteria that may be suitable.

In some implementations, the predetermined criteria may include temporal data associated with the capture of the content items. In some implementations, the predetermined criteria may include the frequency of access of the content items. In some implementations, the predetermined criteria include the likelihood of access of the content items. In some implementations, the predetermined criteria include the importance of the content items. In some implementations, the importance of the content items may be based on the strength of the relationship between a user of the device and one or more persons associated with the content items.

In some implementations, the predetermined criteria may include events coincident with the content items. In some implementations, the predetermined criteria may include at least one criterion selected from the group of: a poster of content items, a recipient of content items, tags added to content items, responses to content items, check-in data associated with content items, geographic and/or location data associated with content items, event data associated with content items, image recognition results, and similarity of content items to other content items.

In one illustrative example, Criteria A 402 is a number of days since the content item was created. The number of days is subtracted from 100, and numbers less than zero are treated as zero. Criteria A 402 is highly weighted, such that Weight 1 (404) is set to 0.5. In this example, Criteria B 406 is frequency of access. Criteria B 406 is set to the number of accesses by the user of this content item in the past 3 months, multiplied by 10, and capped at 100. Criteria B 406 also has a relatively high weight, such that Weight 2 (408) is set to 0.4. In this example, Criteria C 410 is the number of accesses by other people with a high social affinity with the user. The number of accesses is totaled, and capped at 100. Criteria C 410 has a lower weight, and so Weight 3 (412) is set to 0.15. In this example, Criteria n 414 is whether the content of the content item includes someone or something that might be important to the user. The number of entities (persons, places, objects, etc.) in the content item having a social affinity score of greater than 0.5 are totaled, and capped at 100. This Criteria n has an even lower weight, and so Weight n 416 is set to 0.1. In this example, the score is calculated for each content item, and then the content items with the highest score are selected to be retained in or added to local storage until 2 GB of data will be stored. Another 0.3 GB is allocated for placeholders, and so placeholders are created for the next highest scoring content items until 0.3 GB of placeholders has been generated. Finally, all other content items are selected for removal, but their metadata is retained.

In some implementations, the predetermined criteria may be selected based on characteristics of a user. For example, the criteria may be selected based on the user's profile, which may include demographic information and/or other information that the user has provided. For example, a user who indicated that he is of an age to have children, and/or who has indicated that he has children, may want to keep content items related to his children on his device. A criteria of content items relating to his family members generally or to his children in particular may be important and weighted more heavily. A user that has indicated that her hobby is "travel" may be interested in keeping content items related to her trips. A criteria of content items relating to a trip (e.g., whether content items are associated with a different location and/or whether the content of content items are indicative of a trip) may be important and weighted more heavily.

In some implementations, the predetermined criteria may be selected based on characteristics of a user's past behavior. Characteristics of a user's behavior may be determined from patterns in the user's past access of content items. For example, if a characteristic of a user's behavior is that the user tends to access content items associated with a trip, then this is an indication that the user may want to keep content items associated with a trip. A criteria of whether content items are associated with trip (e.g., whether content items are associated with a different location and/or whether the content of content items are indicative of a trip) may be important for that user, and may be weighed more heavily for that user. For example, if a characteristic of a user's behavior is that a user tends to access content items related to a particular subject matter (e.g., landscape photos) or people (e.g., family, friends), the user may want to keep content items associated with that subject matter. A criteria of whether content items are associated with that particular subject matter or specific people, or people with a high social affinity with the user, may be important for that user, and may be weighed more heavily. Thus, the characteristics of a user's past behavior may be used to weigh some criteria more heavily than others to keep what is important to that user.

In some implementations, client devices may observe the behavior of a user with respect to access of content items. For example, access of a content item by a user may be recorded as metadata associated with the content item. Correlation of access metadata with other metadata related to the content item may be used to develop a user model. The user model may then be used to select criteria to use for that particular user. Thus, the user model of a user's behavior may be used to determine what content items to keep on a user's device for that user.

Figure 5:
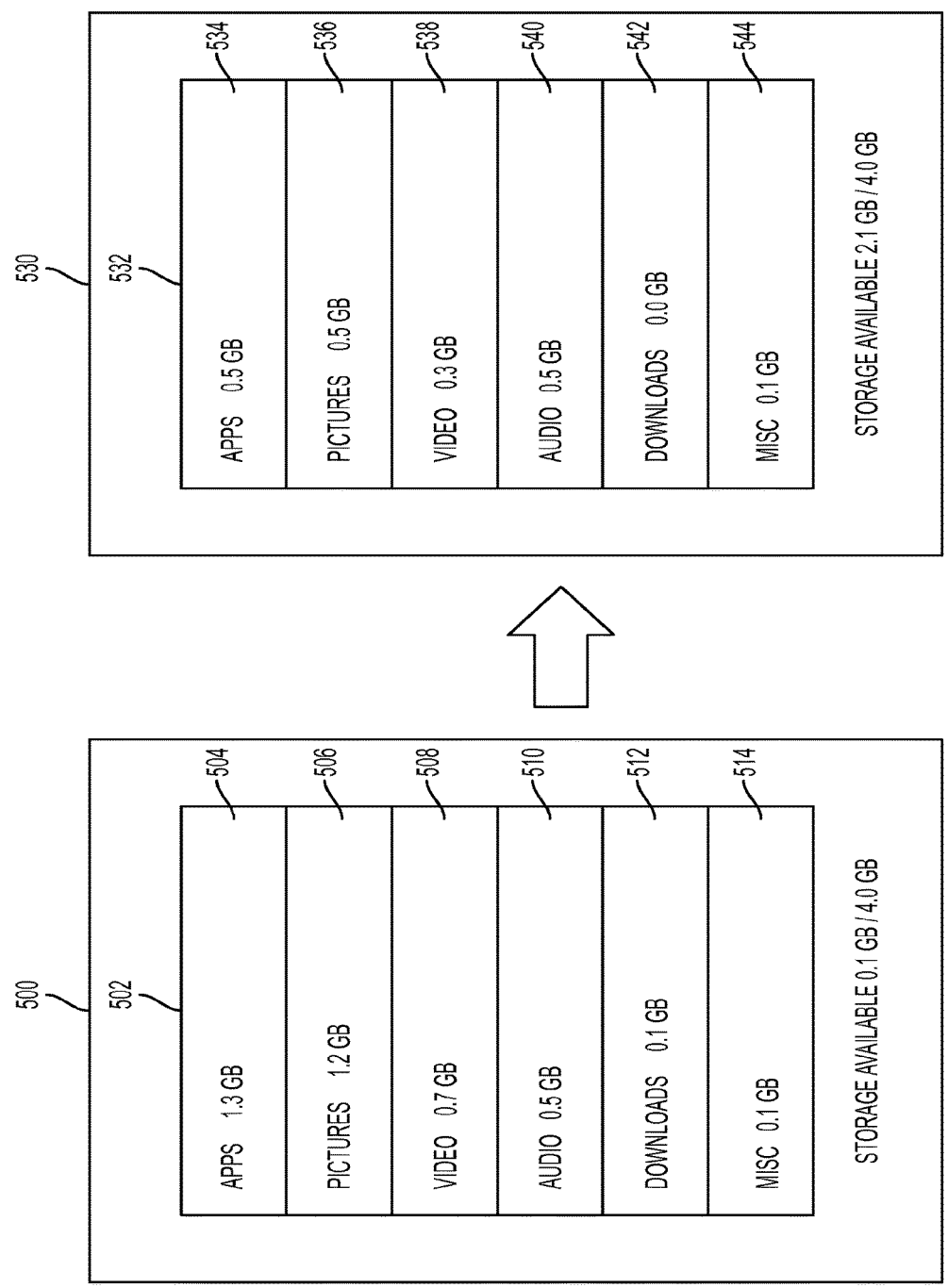
FIG. 5 illustrates an example user interface of a device showing the contents of local storage.

FIG. 5 illustrates an example user interface of a device showing the contents of local storage. As shown in a first example user interface 500, the local storage 502 includes 1.3 GB of Apps (504), 1.2 GB of Pictures (506), 0.7 GB of video (508), 0.5 GB of audio (510), 0.1 GB of downloads (512), and 0.1 GB of uncategorized data (514). The total local storage is shown to be 4.0 GB, with 0.1 GB storage available.

It should be understood that the amounts shown for each category may be measured in a variety of ways, and may include allocations or reservations of data. Also, in this example, the amount of storage shown in the "Apps" category 504 includes both application programs and data associated with specific application programs that is not otherwise classified in the other categories.

Referring to FIGS. 2 and 5, in this example, storage management including a content item backup service is enabled, with the user's permission, and as a result the step of uploading content items to secondary storage 208 is performed regularly or periodically (e.g., a number of times per hour, day, week, or month) when the device is connected to a network. In this illustrated example of FIG. 5, the predetermined criteria designate for removal all data that has not been viewed in over 6 months, and data that is not directly related to the owner of the device based on a social affinity score that meets a threshold. When the selection step 210 and the removal step 212 are performed with the predetermined criteria, the result is shown in a second example user interface 530 shown to the right of the user interface 510.

For example, the user interface 530 may be a screen display that results of the operation of the techniques of FIG. 2 or FIG. 3.

As shown in the second example user interface 530, the local storage 532 includes 0.5 GB of Apps (534), 0.5 GB of Pictures (536), 0.3 GB of video (538), 0.5 GB of audio (540), 0.0 GB of downloads (542), and 0.1 GB of uncategorized data (544). The total local storage is shown to be 4.0 GB, with 2.1 GB storage available.

In the illustrated examples, all of the data that was removed from local storage is still available to the user on a cloud server due to the backup service, and may be downloaded again for use on the device if so desired.

In some implementations, additional content items copied from secondary storage may be included in the local storage 532. Even with the additional items downloaded from secondary storage the amount of available local storage may still be greater due to the content items that are removed from local storage.

Figure 6:
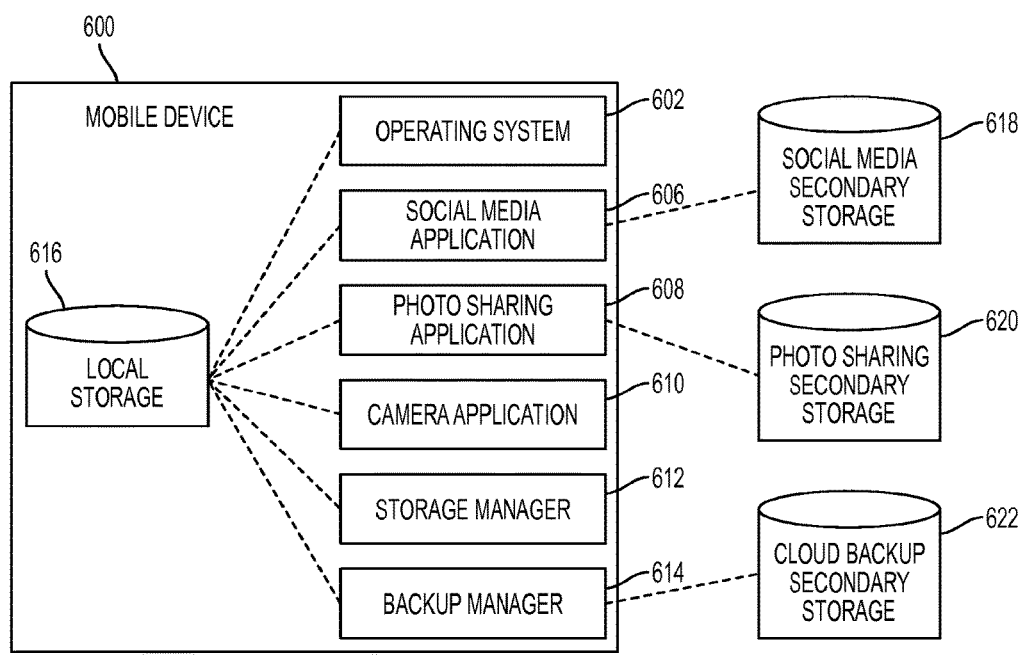
FIG. 6 illustrates a block diagram of a system for storing content items, according to some implementations.

FIG. 6 illustrates a block diagram of a system for storing content items, according to some implementations. Referring to FIG. 6, an example mobile device 600 includes one or more processors and logic instructions encoded in one or more non-transitory tangible media for execution by the one or more processors. When executed, the logic instructions are operable to implement one or more of the modules 602-614 shown in block diagram form in the mobile device 600. The mobile device 600 includes an operating system 602 and media applications, shown as social media application 606, photo sharing application 608, and camera application 610. The mobile device includes a storage manager 612. The mobile device also includes a backup manager 616.

In some implementations, the media applications 606, 608, 610 receive content items. In this example, social media application 606 is a social media application that includes posting, chat and messaging capability; photo sharing application 608 enables sharing of photos; and camera application 610 allows a user to take videos and photos. The videos and photos taken with the camera application 610 may be shared using the social media application 606 and the photo sharing application 608. In some implementations, the storage manager 612 and/or the backup manager 614 may be a part of the operating system 602. In some implementations, the storage manager 612 and/or the backup manager 614 may be a part of the social media application 606, photo sharing application 608, or camera application 610.

The media applications 606, 608, 610 and the storage manager 612 and backup manager 614 are in communication with local storage 616. Local storage 616 is shown as included in the mobile device 600, but the local storage 616 may be external to the mobile device, or temporarily connected to the mobile device (e.g., a flash drive or usb drive). The social media application 606 store messages, photos, and videos received from and shared with other social media users on local storage 616. The photo sharing application 608 stores photos received from and shared with other users of the photo sharing application 608 on the local storage 616. The camera application 610 stores photos and videos created with the mobile device's camera on the local storage 616.

The social media application 606 is also in communication with social media secondary storage 618. This communication may be over a network. In this example, the social media secondary storage is a social media server that holds copies of all of a user's social media information. Items that are sent to other users are uploaded to secondary storage 618, and content items that are sent to the social media application 606 from a social media server also uploaded to social media secondary storage 618. Thus, social content items are uploaded to secondary storage 618 in an ongoing manner.

The photo sharing application 608 is in communication with the photo sharing secondary storage 620. In this example, the photo sharing secondary storage 620 is a photo sharing server that holds copies of all photos that were shared by and with a user. Content items that are sent to other users are uploaded to secondary storage 620, and content items that are sent to the photo sharing application 608 from a photo sharing server are also uploaded to photo sharing secondary storage 620. Thus, photo sharing content items are uploaded to secondary storage 620 in an ongoing manner. Metadata associated with photos may be stored in photo sharing secondary storage 620.

The camera application 610 may be used to take pictures and videos using a camera on the mobile device and to store photos and videos on local storage 616. The camera application may be in communication with the photo sharing secondary storage 620 or may store photos on local storage 616 and allow photo sharing application 608 to communicate with photo sharing secondary storage 620. In some implementations, camera application 610 may be integrated into photo sharing application 608, or photo sharing application 608 may be integrated into camera application 610.

The backup manager 614 is also in communication with cloud backup server secondary storage 622. In this example, the cloud backup secondary storage 622 has a copy of data from the local storage 616 as configured by the user. In this example, the cloud backup secondary storage 622 has a copy of application data, including data from the camera application 610, as well as with the user's consent a record of what applications are used by this mobile device. In this example, the backup manager 614 uploads content items to the cloud backup server secondary storage 622 on a periodic basis (e.g., hourly, daily, weekly, monthly, etc.).

In this example, the storage manager 612 is configured to monitor the available local storage capacity of the local storage 616. In this example, on a periodic basis (e.g., hourly, daily, weekly, monthly, etc.) and/or whenever the mobile device is attached to a network, the storage manager 612 determines whether the local storage 616 capacity meets a threshold local storage 616 capacity level (e.g., is below a predetermined available local storage 616 capacity level). If the local storage 616 capacity level is below, the storage manager 612 selects content items to remove from the local storage based on predetermined criteria. In some implementations, the storage manager 612 may score content items to determine which content items to add or remove from local storage 616.

In this example, the predetermined criteria include items that are copied and available on secondary storage and are over 3 months old. These items are prioritized by their date of access, and the items that have been accessed least recently are selected until the removal would result in the desired local storage 616 capacity level. Since the social medial application 606, the photo sharing application 608 and the backup manager 614 all store copies of data on secondary storage, the content items that they replicate that fit the other predetermined criteria may be removed.

In this example, to remove the social media application 606 content items, the storage manager 612 sends a message to the social media application 606 to remove those content items. In this example, to remove the photo sharing application 608 content items, the storage manager simply deletes the files from the local storage 616. The photo sharing application 608 determines that the photos have been deleted, and marks the photos as deleted from local storage 616 but available from photo sharing secondary storage 620.

If the user later wants to have the removed content items on their device 600, the user can obtain them from the appropriate secondary storage 618, 620, 622. In this example, this may be accomplished using the social media application 606, the photo sharing application 608 or the backup manager 614.

In some implementations, the backup manager 614 and storage manager 612 are included in an application, such as photo sharing application 608. Metadata may be stored in photo sharing secondary storage 620 along with content items.

Implementations described herein provide various advantages. For example, some implementations may allow users to avoid manually managing the storage of content items on their mobile devices between local storage and secondary storage, which can be a time-consuming, difficult, and error-prone process. Some implementations may ensure that users will retain given content items on the local storage of their device for offline viewing (e.g., no internet access). Some implementations may help ensure that users do not accidentally lose their content items as they move content items, which can be a source of difficulty and frustration. Some implementations may therefore encourage users to download and create more content items, because the users do not need to worry about having enough storage on their device, thereby increasing enjoyment derived from their mobile devices. Some implementations may also allow users to effectively use devices with smaller storage capacity, thereby decreasing device cost.

While the client device 110 is described as performing the steps as described in the implementations herein, any suitable component or combination of components of the client device 110 or any suitable processor or processors associated with the client device 110 may perform the steps described.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time.

Various implementations may engage the user in decisions such as whether to enable management of content item storage of content items and if storage management is enabled, which content items will be selected. Some implementations may assume that a user will want to use storage management, and so will implement the described steps by default. Configuration settings may be provided to give a user control over, for example, whether to enable or disable storage management, such as storage manager 612 (FIG. 6), whether to engage in storage management if it is needed, a predetermined available local storage capacity threshold to maintain, the use of certain networks or network types to upload or download content items (e.g., use wifi for upload of content items and not cellular data), and so on. In some implementations, storage management is implemented by default, and permission by the user is assumed unless explicitly declined. In some implementations, permission to use storage management is solicited as part of initial system installation and configuration. In some implementations, permission to use storage management is solicited at a later time. In some implementations, storage management is not implemented until it is needed, and permission is requested at the time that it is needed.

Figure 7:
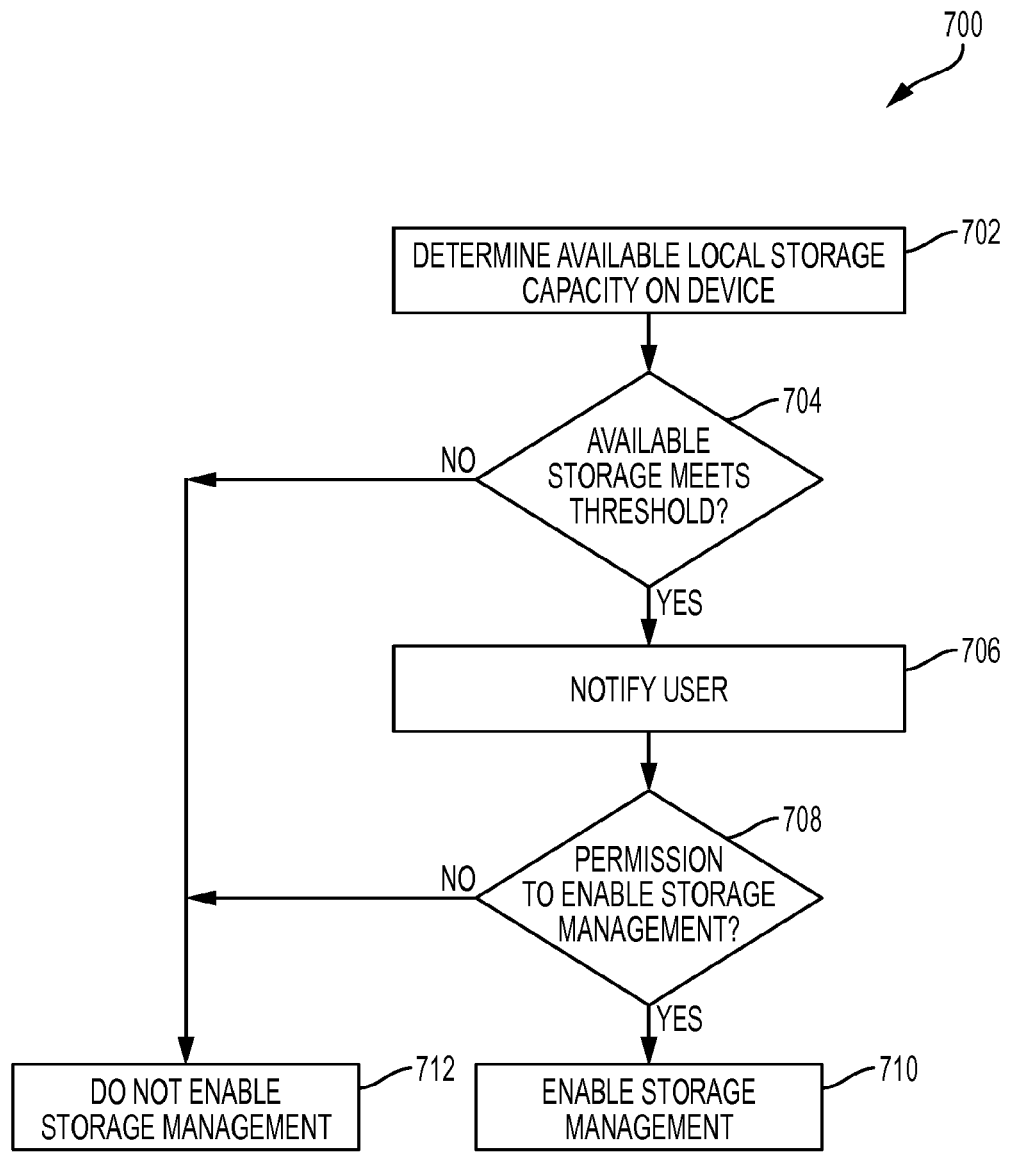
FIG. 7 illustrates an example simplified flow diagram for enabling storage management, according to some implementations.

Referring to FIG. 7, an example simplified flow diagram for enabling storage management, according to some implementations, is shown. An example method 700 may be implemented, for example, as part of an application program or as part of an operating system. For example, the method 700 may be implemented when an application program starts. The application program may be, for example, a photo or video application (e.g., Photo Sharing Application 608 of FIG. 6), a camera application (e.g., Camera Application 610 of FIG. 6), a data and/or file storage application (e.g., Backup Manager 614 of FIG. 6) and/or a social networking application (e.g., Social Media Application 606 of FIG. 6). It should be understood that these are examples and the method 700 may be implemented in any suitable manner. The method 700 may be implemented in an operating system, for example, as an operating system service that first runs when a client device restarts, and/or upon the passing of a time interval, such that the method 700 is performed periodically. The method 700 may be initiated or implemented remotely by another device, for example through use of an application programming interface (API), or by the client device itself. In various implementations, the method 700 may be implemented upon or after receipt of a threshold amount of content items. For example, steps of the method 700 may be integrated into a camera application, such that when new photos are taken, the method 700 is implemented. In various implementations, the threshold number of content items may be a number of photos, videos or images. In various implementations, the threshold amount of content items may be receipt or posting of a number of posts or comments.

The method 700 may include determining 702 the available local storage capacity of a target device, e.g., client device 110. In some implementations, the available local storage capacity may be determined by an operating system. In some implementations, the available local storage capacity may be determined from data that is available on the local storage. For example, in a FAT-32 formatted data store, the capacity of the data store may be determined by accessing the File Allocation Table stored on the data store. The available capacity of a storage device also may be determined by the operating system and/or from other data stored on the target device.

In some implementations, an available local storage capacity may be determined based on the space available on the storage device that is currently unused and allocations and/or reservations made by the operating system and/or applications or storage space that may be needed. For example, an operating system may reserve a portion of the available space for applications and for temporary storage. In this example, the available local storage capacity may be the available storage space on a local storage device reduced by such reservation or allocation.

The method 700 may include determining 704 whether available local storage capacity meets a threshold level (e.g., is above or below a predetermined threshold level). This threshold level may be a percentage of total storage capacity. The threshold level may be a minimum amount of available local storage capacity. The threshold level may be determined by monitoring the usage of the device. The threshold level may be determined from the historical usage of the application by the user. The threshold level may be determined from historical use of the application by other users, for example, users with a degree of social affinity with the target user.

If the available local storage capacity meets the threshold level, the user is notified 706. This notification may include displaying an alert to the user. The notification may include displaying a dialog box as part of the operation of an application program implementing the method. The notification may include displaying a graphic or making a sound. The notification may include using notifications provided by the device operating system for notifying a user.

The notification may include a request for permission to enable storage management. For example, the notification may include a button for the user to click or to press to enable storage management for the device. The notification may include a link to additional information about the storage management capability.

In some implementations, permission to enable storage management may be included in settings for an application program or operating system implementing the method. For example, permission to enable storage management if needed may be enabled by default in an application program or operating system. For example, permission to enable storage management if needed may be disabled by default in an application program or operating system. The notification may include a display of current permission settings. The notification may allow a user to change the settings as part of the notification, or to go to a settings screen where permission to enable storage management may be indicated.

The method includes determining 708 whether the user has given permission to enable storage management. Permission may be implicit or explicit permission. For example, the user may need to supply explicit permission, or the user's permission may be implied by the user's other actions, such as registration or agreement to the operation of cloud backup or other application features.

With permission, and with available local storage capacity meeting the applicable threshold, storage management is enabled 710. Storage management may include, for example, implementing some or all of the steps of method 200 of FIG. 2, method 300 of FIG. 3, and/or the Storage Manager 612 of FIG. 6.

If the available storage is not determined to meet the threshold in block 704, or if permission is determined as not be granted in block 708, storage management is not enabled in block 712.

In some implementations, a method for enabling management of local storage on a mobile device includes determining available local storage capacity on a mobile device, comparing the determined available local storage capacity to a threshold, and if the determined available local storage capacity meets the threshold, enabling storage management. In some implementations, the method includes determining that permission has been granted implicitly or explicitly to enable storage management. A determination of permission may be required to enable storage management.

In some implementations, a system for enabling management of local storage on a mobile device includes one or more processors and logic encoded in one or more tangible media for execution by the one or more processors that when executed is operable to determine available local storage capacity on a mobile device and compare the determined available local storage capacity to a threshold. If the determined available local storage capacity meets (e.g., is below) the threshold, enabling storage management. In some implementations, the instructions are further operable to determine that permission has been granted implicitly or explicitly to enable storage management. A determination of permission may be required to enable storage management.

In some implementations, a computer readable storage medium has control logic stored therein for management of local storage on a mobile device. The control logic may include a first computer readable program code that determines available local storage capacity of a mobile device. The control logic may include a second computer readable program code that compares the determined available local storage capacity to a threshold. The control logic may include a third computer readable program code that enables storage management if the determined available local storage capacity meets (e.g., is at or below) the threshold. In some implementations the control logic may include a fourth computer-readable program code that determines that permission has been granted implicitly or explicitly to enable storage management. A determination of permission may be required to enable storage management.

Figure 8:
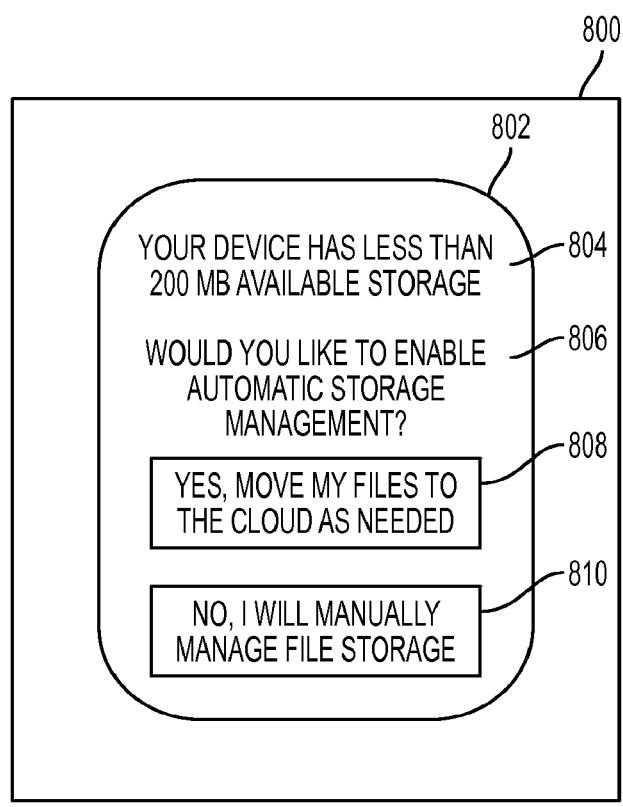
FIG. 8 illustrates an example of a screen display according to some implementations.

Referring to FIG. 8, an example screen display 800 according to some implementations, for example, of a client device such as a mobile device, is shown with an example alert 802. The alert 802 includes an indication 804 that local available storage capacity meets a threshold (e.g., is below a predetermined threshold). For example, the predetermined threshold may be a fixed amount, such as 100 MB, 200 MB, 1 GB, a percentage of total storage capacity or assigned allocation (e.g., 5%, 10%, 15%, etc.), the amount of storage needed for a number of photos (e.g., 100 photos, 200 photos, 500 photos, 1000 photos, etc.) or an amount of video (e.g., 10 minutes of video, 20 minutes of video, 30 minutes of video), or the amount of storage needed to last a number of days at current usage patterns (e.g., 1 day, 2 days, 3, days, 7 days, etc.). It should be understood that this threshold is illustrative, and any suitable value may be used. For example, the predetermined threshold value may be based at least in part on the local storage device. For example, the predetermined threshold value may be based at least in part on the anticipated storage needs of the user. Anticipated storage needs of a user may be determined based at least in part on prior storage space usage patterns of the user. Anticipated storage needs of a user may be determined based at least in part on typical usage for the software application(s) recently used by the user.

The example alert 802 also includes an explicit request 806 for permission to enable automatic storage management. Alert 802 include a first button 808 on the alert for the user to enable storage management (i.e., to give permission for storage management). The text on the first button 808 states "Yes, move my files to the cloud as needed." If the user activates the first button 808, for example by pushing the button on a touch screen, or for example clicking with a mouse, storage management capability will be enabled. Alert 802 includes a second button 810 on the example alert 802 for the user to decline storage management (i.e., to withhold permission for storage management). The text on the second button 810 states "No, I will manually manage file storage." If the user activates the second button 810, storage management capability will not be enabled.

Referring to FIG. 9, an example of a screen display 900 according to some implementations includes a notification 902 that content items have been backed up to secondary storage. This is indicated by the words "All photos backed up." The screen display 900 also includes an alert notification 904 indicating that available storage capacity is above a predetermined threshold. The screen states "Device storage almost full. You have space for about 90 more photos. You can safely remove copies without deleting them from your Photos library. Remove Copies & Free Space." This alert notification 904 may be used on a touch screen, such that if the user taps on the alert 904 it will enable storage management.

Referring to FIG. 10, an example of a screen display 1000 according to some implementations includes a collection of notifications, including an alert notification 1002 indicating that available storage capacity is above a predetermined threshold. In this screen display 1000, for clarity the other notifications have been shown as greyed out as they may pertain to other alerts or notifications for the same or other applications or the operating system. The alert notification 1002 states "Device storage almost full. Remove backed-up photos to save space." This alert notification 1002 may be presented, for example, in a collection of alerts or notifications provided to a device user. For example, in cases where an application is running in the background, a notification may be presented in a list of notifications. This alert notification 1002 may be used on a touch screen, such that if a user taps on the alert 1002 it will enable storage management.

Figure 11:
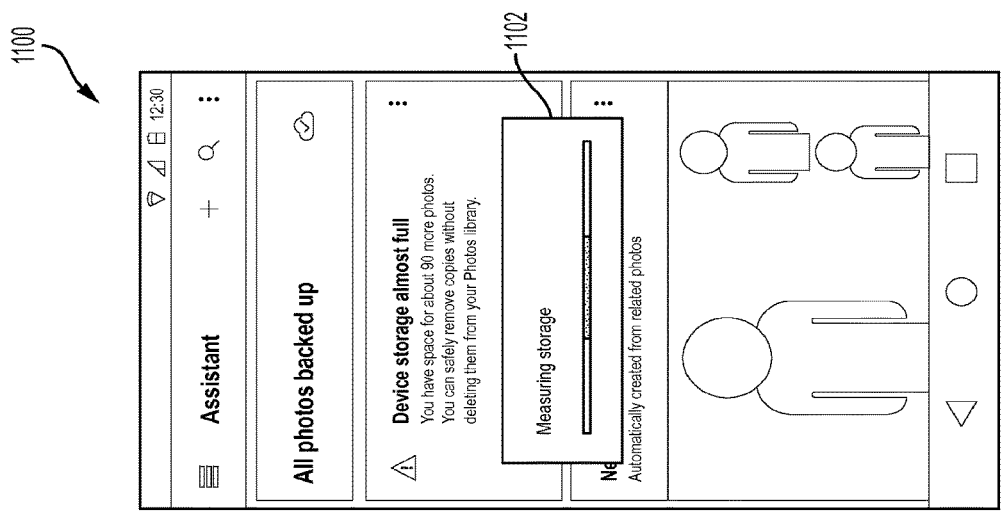
FIG. 11 illustrates an example of a screen display according to some implementations.

Referring to FIG. 11, an example of a screen display 1100 according to some implementations includes a notification 1102 indicating that the device is measuring available storage. For example, in some implementations if the user activates the alert notification 904 of FIG. 9 or the alert notification 1002 of FIG. 10, this screen would then be presented, to indicate that the device is determining the available storage capacity for content items. This may also include, for example, updating metadata. When storage capacity has been determined, a display such as that of FIG. 12 may be used to further communicate with the user.

It should be understood that the example screen display of FIG. 11 is optional. For example, in some implementations, measuring available storage may take place in the background, so that a progress indicator is not used.

Figure 12:
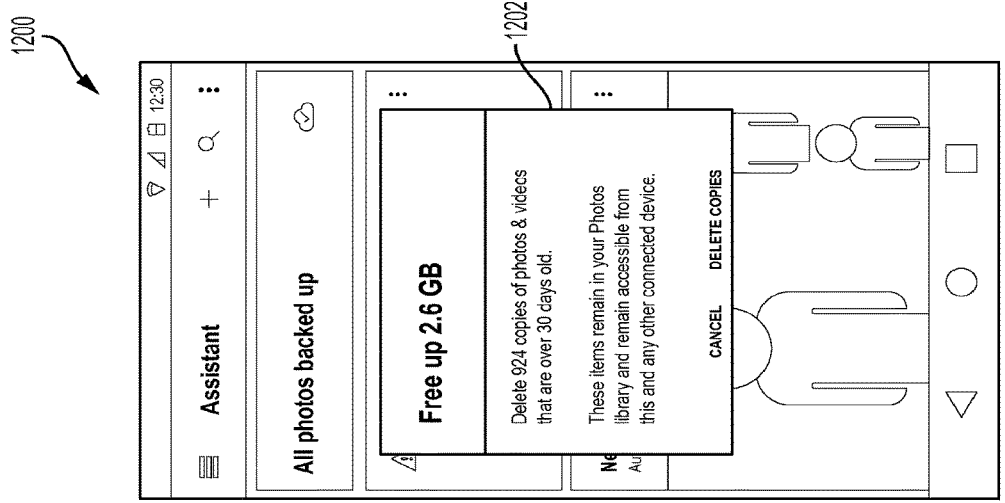
FIG. 12 illustrates an example of a screen display according to some implementations.

Referring to FIG. 12, an example of a screen display 1200 according to some implementations includes a notification 1202 that content items may be removed from the device to provide additional storage capacity. The notification 1202 states "Free up 2.6 GB. Delete 924 copies of photos & videos that are over 30 days old. These items remain in your Photos library and remain accessible from this and any other connected device." In this example, the device has determined that 924 photos and videos have already been copied to secondary storage and may be removed in order to create additional available storage capacity. The notification 1202 includes an option "Delete Copies," which will continue the storage management process. As will be shown, in this example, the device will provide another notification prior to deleting content items. The notification 1202 also includes an option "Cancel." If the user selects the option to cancel, the device would not remove content items from the device.

Referring to FIG. 13, an example of a screen display 1300 according to some implementations includes a notification 1302 that content items will be deleted. Specifically, the notification 1302 states "Delete device copies. All 924 items remain in your Photos library." This notification 1302 gives the user another opportunity to halt storage management and the removal of content items from the device. There is an option "Delete copies" that may be selected by a user, for example, by touching on a touch screen. If the user selects "Delete copies", the device will continue with storage management, for example by making placeholder copies and/or removing content items from the device. If the user selects "Cancel" the device would not remove content items from the device.

Referring to FIG. 14, an example of a screen display 1400 according to some implementations includes a notification 1402 that additional storage capacity is now available. The notification in this example states "2.6 GB device storage recovered." This indicates that storage management was able to free up an additional 2.6 GB of storage capacity on the device. It should be understood that the 2.6 GB shown is demonstrative, and that the actual amount will depend on the content items and available storage capacity.

Figure 15:
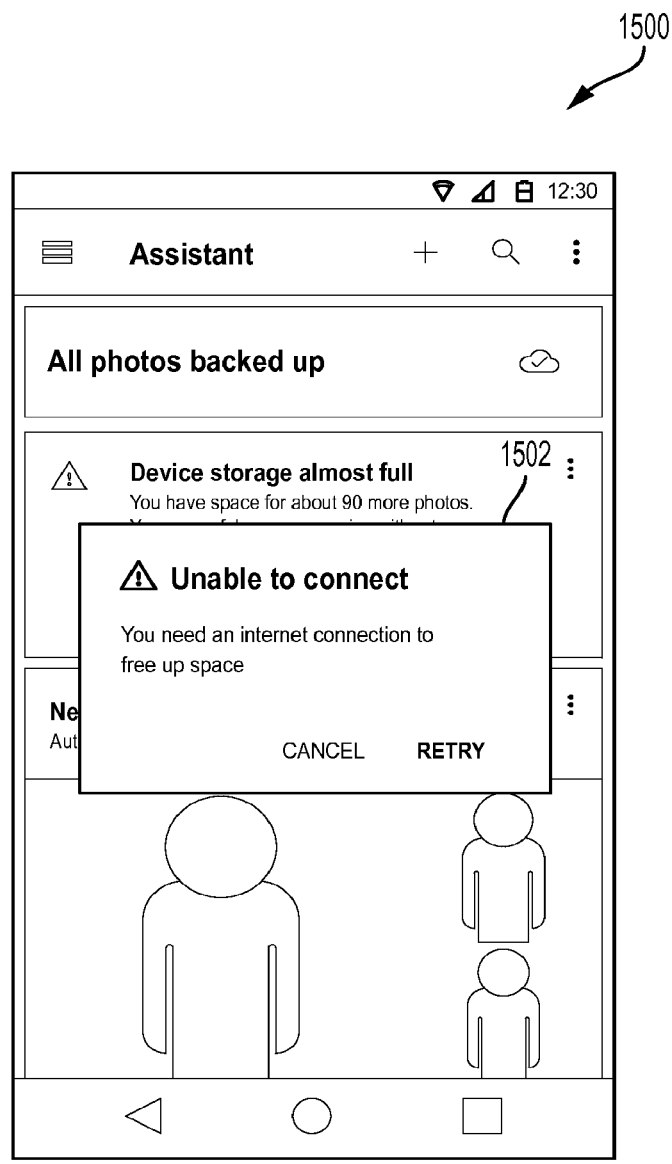
FIG. 15 illustrates an example of a screen display according to some implementations.

Referring to FIG. 15, an example of a screen display 1500 according to some implementations includes a notification 1502 that the device is unable to connect to secondary storage, and so storage management is unable to continue. The notification 1502 may be displayed, for example, as a result of the activation of the alert 808 of FIG. 8, the alert 904 of FIG. 9, or the alert 1002 of FIG. 10, in the case where the device is unable to communicate with the secondary storage. This may occur, for example, if a network (e.g., an Internet) connection is disrupted or unavailable. Storage management also may not be able to operate if the device is unable to communicate with secondary storage for other reasons. In the case where secondary storage was available via another network, or was locally available on the device, a connection to a particular communications network such as the Internet may not be necessary.

Figure 16:
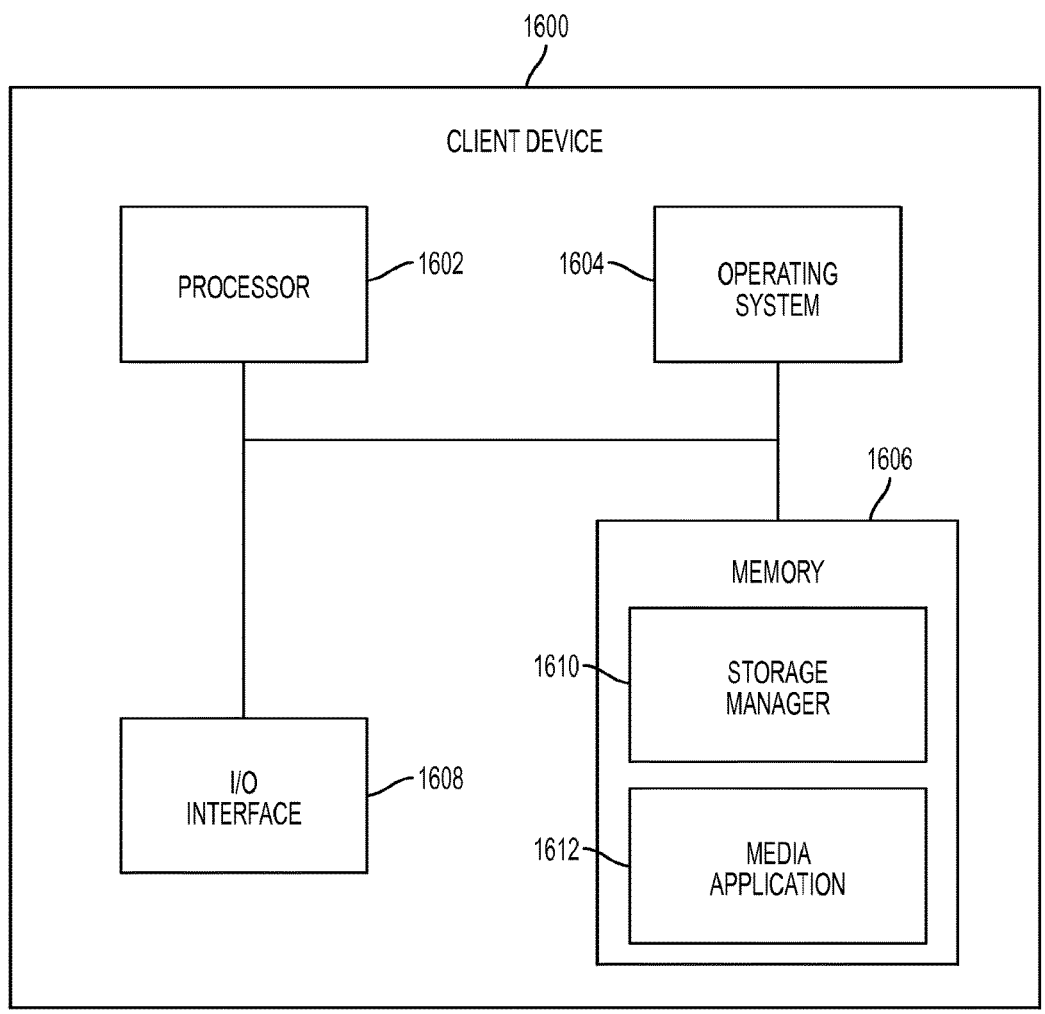
FIG. 16 illustrates a block diagram of an example client device, which may be used to implement the implementations described herein.

FIG. 16 illustrates a block diagram of an example client device 1600, which may be used to implement the implementations described herein. For example, client device 1600 may be used to implement client device 110 of FIG. 1, as well as to perform the method implementations described herein. In some implementations, client device 1600 includes a processor 1602, an operating system 1604, a memory 1606, and an input/output (I/O) interface 1608. The memory 1606 may be a non-transitory computer-readable storage medium that stores data that provides the functionality described herein. The memory 1606 may be a dynamic random access memory (DRAM) device, a static random access memory (SRAM) device, flash memory, or some other memory device. In some implementations, the memory 1606 also includes a non-volatile memory or similar permanent storage device and media including a hard disk drive, a floppy disk drive, a read-only memory (ROM) device, a CD-ROM device, a DVD-ROM device, a DVD-RAM device, a DVD-RW device, a flash memory device, or some other mass storage device for storing information on a more permanent basis. Client device 1600 also includes a storage manager 1610 and a media application 1612, which may be stored in memory 1606 or on any other suitable storage location or computer-readable medium. Storage manager 1610 provides instructions that enable processor 1602 to perform the functions described herein and other functions.

For ease of illustration, FIG. 16 shows one block for each of processor 1602, operating system 1604, memory 1606, I/O interface 1608, storage manager 1610, and media application 1612. These blocks 1602, 1604, 1606, 1608, 1610, and 1612 may represent multiple processors, operating systems, memories, I/O interfaces, social network engines, and media applications. In other implementations, client device 1600 may not have all of the components shown and/or may have other elements including other types of elements instead of, or in addition to, those shown herein.

Although described with respect to particular implementations, these particular implementations are merely illustrative, and not restrictive. Concepts illustrated in the examples may be applied to other examples and implementations.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some particular implementations, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

The client device may include, but is not limited to, a single processor system, a multi-processor system (co-located or distributed), a cloud computing system, or a combination of the above.

The client (or user, member or target user) device may include, but is not limited to, a desktop computer, a laptop computer, a portable computer, wearable computer, a tablet computing device, a smartphone, a feature phone, a personal digital assistant, a media player, a camera or media capture device, an electronic book reader, an entertainment, navigation, or computing system of a vehicle, or the like. Other examples of devices include computing and/or display systems built into windows, walls, furniture, glasses, goggles, wrist watches, clothing or the like. In general, any computing device capable of implementing one or more of the methods described herein may be used.

The client devices may be connected to a server via a network. The network connecting user devices to a server may be a wired or wireless network, and may include, but is not limited to, a Wi-Fi network, a local area network, a wide area network, the Internet, or a combination of the above.

The data storage, memory and/or non-transitory computer readable medium may be a magnetic storage device (hard disk drive or the like), optical storage device (CD, DVD or the like), electronic storage device (RAM, ROM, flash, or the like). The software instructions may also be contained in, and provided, for example in the form of software as a service (SaaS) delivered from a server (e.g., a distributed system and/or a cloud computing system).

Moreover, some implementations of the disclosed method, system, and computer readable media may be implemented in software (e.g., as a computer program product and/or computer readable media having stored instructions). The stored software instructions may be executed on a programmed general purpose computer, a special purpose computer, a microprocessor, or the like.

In various implementations, assistant services may be accessed on a device to assist the needs of a user. In some implementations, assistant services may be provided from one or more systems accessed remotely over one or more networks, such as the Internet or World Wide Web. For example, the services may be provided by one or more server systems connected to a network. Some implementations may implement assistant services locally to a device. Expert systems may be used in some implementations to provide desired information in specific subjects.

In some implementations, assistant services may include the use of intelligent assistants or "agents." These agents may be software that is accessible to a user using a device and that may access local functions and features of the device, as well as remote assistant services to gather information and/or perform actions to assist a user of the device. The agent may perform any of a variety of assistive functions.

Some implementations may provide an agent having a simple and natural interface to allow users to easily interact with the agent. In some examples, agents may perform user-friendly natural language processing of user input, for example user may use spoken input. For example, an agent may use voice recognition systems to interpret spoken input from user.

In situations where a system collects and/or uses personal information about users, or may make use of personal information, the users may be provided with an opportunity to control whether programs or features collect user information (e.g., information about a user's social network, social actions or activities, profession, a user's preferences, or a user's current location), or to control whether and/or how to receive content items from server that may be more relevant to the user. In addition, certain data may be treated in one or more ways before it is stored or used, so that personally identifiable information is removed. For example, a user's identity may be treated so that no personally identifiable information may be determined for the user, or a user's geographic location may be generalized where location information is obtained (such as to a city, ZIP code, or state level), so that a particular location cannot be determined. Thus, the user may have control over how information is collected by the system and used.

What is claimed is:

1. A system for management of local storage on a mobile device, comprising:
   one or more processors; and
   a tangible medium with instructions stored thereon, the instructions when executed cause the one or more processors to:
   determine available local storage capacity of a local storage of a mobile device;
   determine that the available local storage capacity meets a threshold available local storage capacity;
   in response to a determination that the available local storage capacity meets the threshold available local storage capacity, select one or more selected content items of content items to store in the local storage based on a ranking of the content items using predetermined criteria, wherein the predetermined criteria include at least one of:
   determination that the one or more selected content items were captured at an event, or a score that represents a degree of a social affinity between a user of the mobile device and one or more persons associated with the one or more selected content items;
   download the one or more selected content items to the mobile device from a secondary storage; and
   store the one or more selected content items in the local storage on the mobile device.

2. The system of claim 1, wherein the instructions further cause the one or more processors to create a placeholder copy of at least one content item of the one or more selected content items on the mobile device.

3. The system of claim 1, wherein the secondary storage comprises cloud storage that is remote from the mobile device.

4. The system of claim 1, wherein the instructions further cause the one or more processors to remove from the local storage, one or more content items that were not selected.

5. The system of claim 1, wherein the mobile device is a wearable device, wherein the predetermined criteria include access of the content items from the wearable device, and wherein the secondary storage is storage on a smart phone distinct from the mobile device.

6. The system of claim 1, wherein the predetermined criteria are selected based on a user profile.

7. The system of claim 1, wherein the instructions further cause the one or more processors to remove from the local storage, one or more locally stored content items to achieve the threshold available local storage capacity.

8. The system of claim 1, wherein the instructions further cause the one or more processors to upload one or more of the content items from the mobile device to the secondary storage.

9. The system of claim 1, wherein the predetermined criteria further comprises one or more of temporal data associated with creation of the content items or frequency of access of the one or more selected content items.

10. The system of claim 1, wherein the threshold available local storage capacity is determined, at least in part, on historical usage by a user of the mobile device.

11. A computer implemented method for management of local storage on a mobile device, the method comprising:
    determining available local storage capacity of a local storage of a mobile device;
    determining that the available local storage capacity meets a threshold available local storage capacity;
    in response to a determination that the available local storage capacity meets a threshold available local storage capacity, selecting one or more selected content items of content items to store in the local storage based on a ranking of the content items using predetermined criteria, wherein the predetermined criteria include at least one of:
    determination that the one or more selected content items were captured at an event, or a score that represents a degree of a social affinity between a user of the mobile device and one or more persons associated with the one or more selected content items;
    downloading the one or more selected content items to the mobile device from secondary storage; and
    storing the one or more selected content items in the local storage on the mobile device.

12. The method of claim 11, wherein the predetermined criteria further comprises one or more of temporal data associated with creation of the content items or frequency of access of the one or more selected content items.

13. The method of claim 11, further comprising removing from the local storage, one or more locally stored content items to achieve the threshold available local storage capacity.

14. The method of claim 13, wherein removing of one or more locally stored content items is based on removal predetermined criteria comprising one or more of temporal data associated with creation of the content items, frequency of access of the one or more selected content items, detection of an event associated with creation of the one or more selected content items, or a score calculated to represent a degree of a social affinity between a user of the mobile device and one or more persons associated with the one or more selected content items.

15. The method of claim 11, wherein the threshold available local storage capacity is determined, at least in part, on historical usage by a user of the mobile device.

16. A non-transitory computer-readable medium storing instructions that, when executed by one or more processors, cause the one or more processors to:
- determine available local storage capacity of a local storage of a mobile device;
- determine that the available local storage capacity meets a threshold available local storage capacity;
- in response to a determination that the available local storage capacity meets a threshold available local storage capacity, select one or more selected content items of content items to store in the local storage based on a ranking of the content items using predetermined criteria, wherein the predetermined criteria include at least one of: determination that the one or more selected content items were captured at an event, or a score that represents a degree of a social affinity between a user of the mobile device and one or more persons associated with the one or more selected content items;
- download the one or more selected content items to the mobile device from a secondary storage; and
- store the one or more selected content items in the local storage on the mobile device.

17. The computer-readable medium of claim 16, wherein the predetermined criteria further comprises one or more of temporal data associated with creation of the content items or frequency of access of the one or more selected content items.

18. The computer-readable medium of claim 16, wherein the instructions further cause the one or more processors to remove from the local storage, one or more locally stored content items to achieve the threshold available local storage capacity.

19. The computer-readable medium of claim 18, wherein removing of one or more locally stored content items is based on removal predetermined criteria comprising one or more of temporal data associated with creation of the content items, frequency of access of the one or more selected content items, detection of an event associated with creation of the one or more selected content items, or a score calculated to represent a degree of a social affinity between a user of the mobile device and one or more persons associated with the one or more selected content items.

20. The computer-readable medium of claim 18, wherein the threshold available local storage capacity is determined, at least in part, on historical usage by a user of the mobile device.

* * * * *